United States Patent [19]
Reboredo

[11] Patent Number: 5,689,956
[45] Date of Patent: Nov. 25, 1997

[54] HYDRAULIC VARIABLE SPEED DRIVE

[76] Inventor: Elena Canosa Reboredo, Calle Mayor de Serria 216, E-08017 Barcelona, Spain

[21] Appl. No.: 669,416
[22] PCT Filed: Nov. 6, 1995
[86] PCT No.: PCT/ES95/00123
  § 371 Date: Jul. 3, 1996
  § 102(e) Date: Jul. 3, 1996
[87] PCT Pub. No.: WO96/14524
  PCT Pub. Date: May 17, 1996

[30] Foreign Application Priority Data

Nov. 8, 1994 [ES] Spain ................... 9402300

[51] Int. Cl.⁶ ........................................ F16D 39/00
[52] U.S. Cl. ........................................ 60/491
[58] Field of Search ................... 60/487, 490, 491

[56] References Cited

U.S. PATENT DOCUMENTS

| | | | |
|---|---|---|---|
| 3,808,814 | 5/1974 | Macy, II | 60/487 |
| 4,109,466 | 8/1978 | Keech | 60/487 |
| 4,578,948 | 4/1986 | Hutson et al. | 60/487 |
| 5,243,822 | 9/1993 | Vismara | 60/487 X |

FOREIGN PATENT DOCUMENTS

| | | | |
|---|---|---|---|
| 467612 | 6/1914 | France. | |
| 893799 | 10/1944 | France. | |
| 1290255 | 3/1962 | France. | |
| 511620 | 2/1955 | Italy | 60/487 |
| 2167164 | 5/1986 | United Kingdom. | |
| 9316301 | 8/1993 | WIPO. | |

*Primary Examiner*—Hoang Nguyen
*Attorney, Agent, or Firm*—Steinberg, Raskin & Davidson, P.C.

[57] ABSTRACT

A hydraulic variable speed drive assembly including a hydraulic pump having a cylinder with an associated end cover, a hydraulic motor having a cylinder with an associated end cover, and an intermediate plate with ports or passages for enabling a flow of fluid from the hydraulic pump to the hydraulic motor at a high pressure and from the hydraulic motor to the hydraulic pump at a low pressure, in order to close the circuit. The shafts of the rotors of the hydraulic pump and the hydraulic motor have a common geometric axis, static with respect to the outside, about which they can rotate independently, this rotation being their only possible movement. The variable drive assembly has as its only possible movement, the rotation about a geometric axis fixed with respect to the outside and is different from the geometric axis of the hydraulic pump cylinder, from the geometric axis of the hydraulic motor cylinder, and from the common geometric axis of the rotors. The rotation of the variable drive assembly is effected from the outside and results in that the hydraulic pump cylinder and the hydraulic motor cylinder approach or withdraw their geometric axes with respect to those of their corresponding rotors, thus causing variation of the ratio between the rotation speeds of the hydraulic pump rotor and of the hydraulic motor rotor.

9 Claims, 12 Drawing Sheets

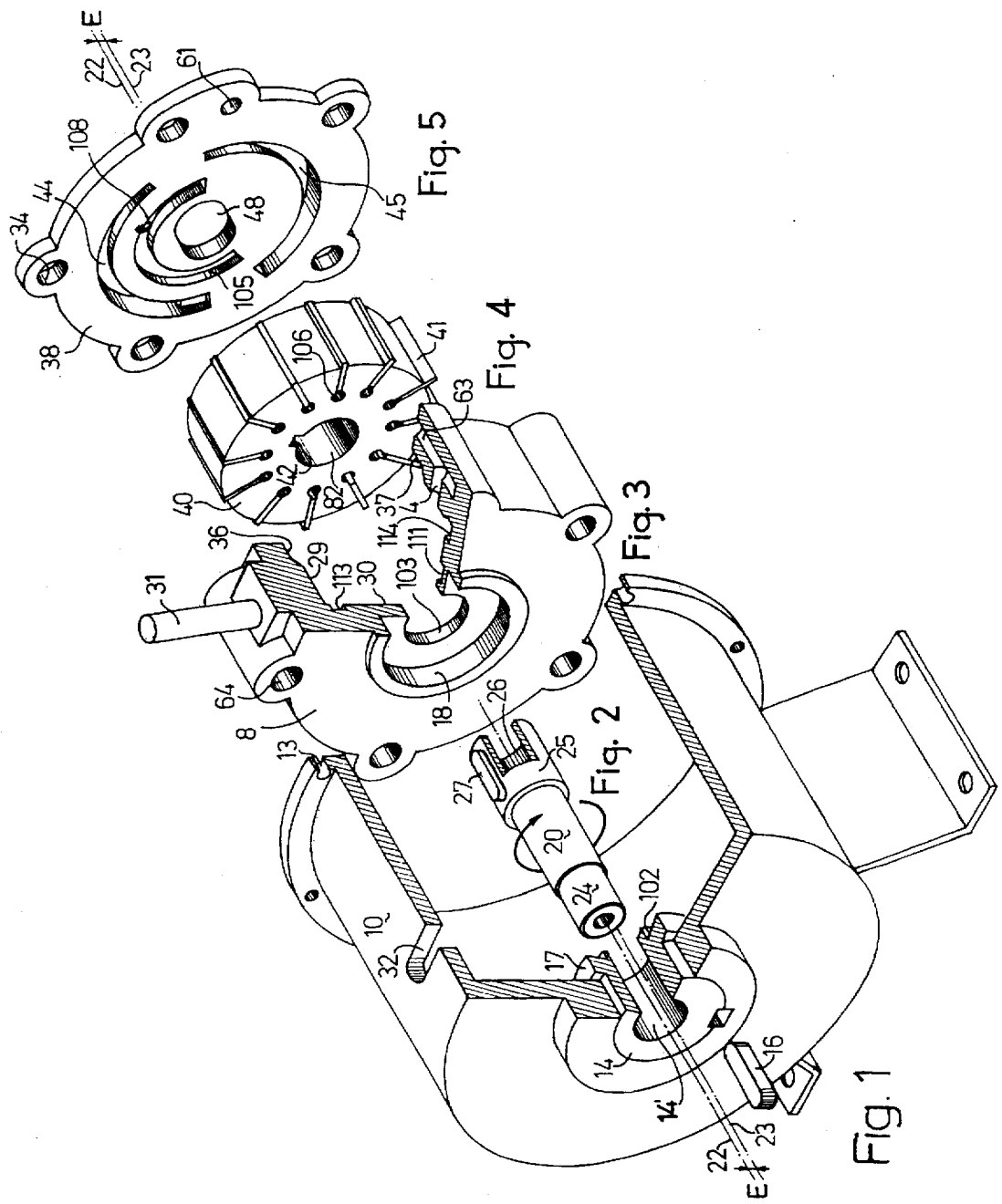

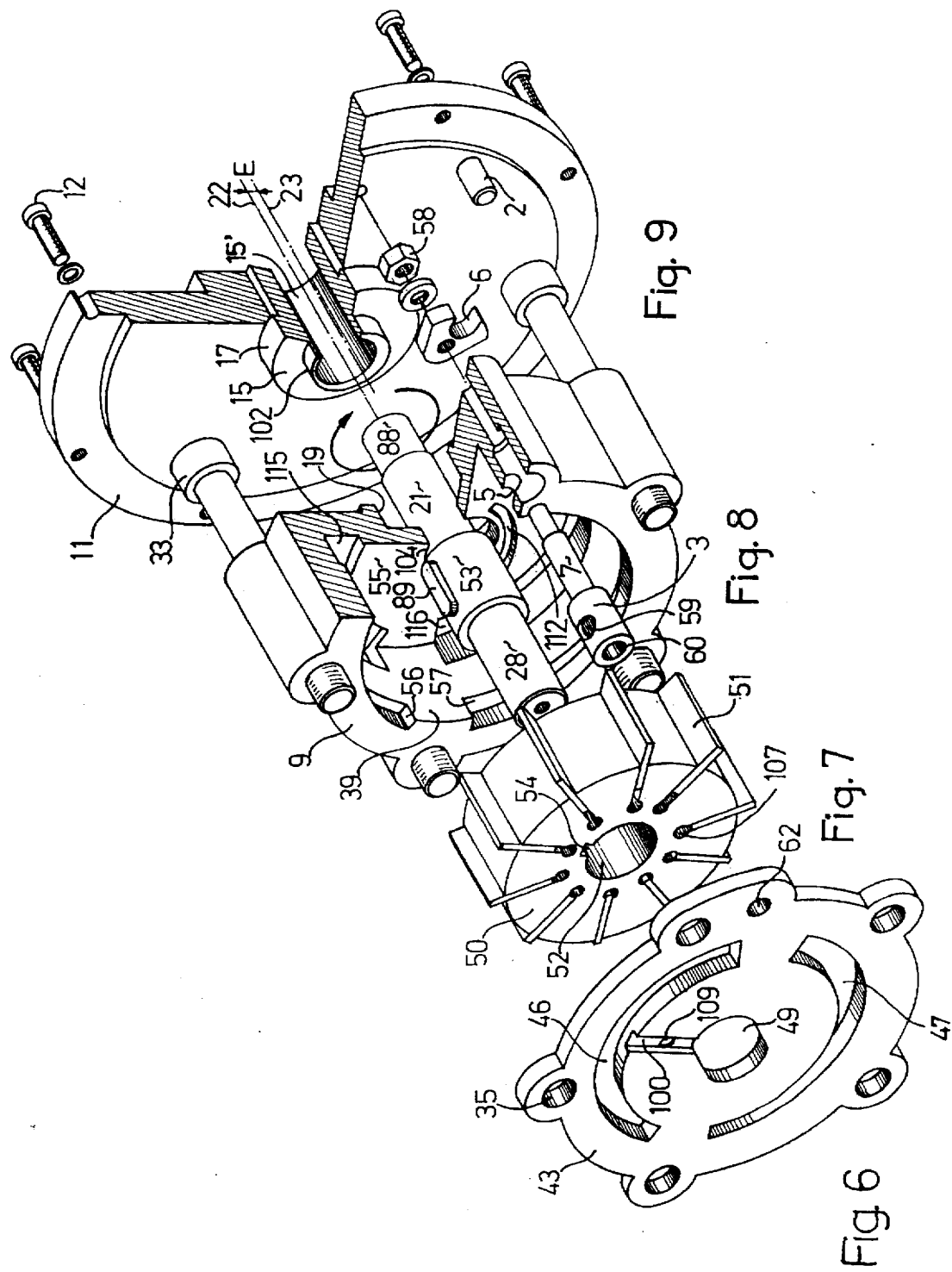

HYDRAULIC VARIABLE SPEED DRIVE

The present invention relates to variable speed drives which are constituted essentially by an hydraulic pump and an hydraulic motor.

BACKGROUND OF THE INVENTION

In known hydraulic variable speed drives, both the hydraulic pump and the hydraulic motor are vane pumps of known type, each including a rotor or drum provided with a number of vanes of rectangular shape that are housed within grooves formed axially in said rotor and are in contact at their end with a cylindrical surface, which is the inner surface of the cylinder of the pump, and sideways with covers, one or both of them being provided with a central opening and allowing the shaft of their rotor, that is integral therewith, to pass therethrough towards the outside. The axes of the rotor and of the cylinder, remaining parallel to each other, may vary the distance between them by means of a specific mechanism, such that the volume defined by the cells or chambers formed by each two adjacent vanes, the cylindrical sections limiting said vanes in the rotor and in the cylinder, and their side covers, varies when the rotor is turned. This variation ranges between a null value when the axes of the rotor and of the cylinder are overlapped and a maximum value when the rotor is tangent to the inner surface of the cylinder. When these chambers are fully occupied by a fluid, the eccentricity between the axes of the rotor and of the cylinder results in a flow of said fluid in one direction if the eccentricity of the axis of the rotor with respect to the axis of its cylinder varies between zero and a maximum value, and in opposite direction when said eccentricity varies in opposite direction. Obviously, for this purpose, all the chambers of the hydraulic pump that for one direction of rotation of its rotor experiment a decrease of their volume have to be in communication with all the chambers of the hydraulic motor that for the same direction of rotation of its rotor experiment an increase of their volume, the fluid flow between the hydraulic pump and the hydraulic motor in one direction being thereby allowed, while all the chambers of the hydraulic motor that experiment a decrease in volume have to be in communication with all the chambers of the hydraulic pump that for the same direction of rotation find their volume increased, thereby allowing the flow of fluid in the opposite direction, thus closing the flow circuit. Therefore, when a rotation at a certain speed is imparted to the shaft of the hydraulic pump, another rotation, equal or different from that of said shaft, is obtained in the shaft of the hydraulic motor, the latter being a function, amongst others, of the eccentricity parameters of the rotors with respect to their cylinders; in this way are generated the known variable speed drives constituted by vane pumps.

Such variable speed drives known up to now have a number of drawbacks, which don't allow their universal use: in the first place, the problem of the fluidtightness of the assembly has not been solved satisfactorily, since in known devices the speed variation is achieved by means of linear shifts of some axes with respect to others, and this naturally makes the sealing of the assembly very complicated. As a consequence of this fluidtightness problem, the fluid pressures that the variable drive can bear are low, and therefore the power that can be transmitted is limited. Other drawbacks of these known variable drives are their large dimensions and weight, that prevent their use, for example, in the field of the automotive industry and in many others where the occupation of space is an important or even vital requirement. For obvious reasons, the cost of such variable drives is also very high.

DESCRIPTION OF THE INVENTION

On this known type of variable speed drives briefly described above we will now explain the differences that characterize the improvements introduced in the present invention, both in arrangement and in operation, and that improve substantially the versatility thereof.

The hydraulic variable speed drive object of this patent aims to achieve enhanced compactness with respect to known variable speed drives and greater simplicity, both as regards its parts and the solution adopted for the sealing of the fluid that will act at high pressure within the drive, between the hydraulic pump and the hydraulic motor, said characteristics obviously resulting in important advantages compared with the hydraulic variable speed drives now available internationally.

In order to achieve the above aims an integral block has been designed, called variable drive assembly, that comprises the cylinder of the hydraulic pump, the cylinder of the hydraulic motor, their end covers and the intermediate plate between them, in which are formed the ports or passages for the fluid from the hydraulic pump to the hydraulic motor at high pressure and from the hydraulic motor to the hydraulic pump at low pressure to close the circuit. The shafts of the rotor of the hydraulic pump and of the rotor of the hydraulic motor have a common geometric axis, static with respect to the outside, around which they can turn independently from each other, this rotary motion being their only possible movement.

The variable drive assembly will only be able to turn around a geometric axis, static with respect to the outside and different from the geometric axis of the cylinder of the hydraulic pump and from the geometric axis of the cylinder of the hydraulic motor, and also different from the common geometric axis of the rotors. The rotation of the variable drive assembly, that will be driven from the outside either by hand or by means of a specific mechanism, achieves that the cylinder of the hydraulic pump and the cylinder of the hydraulic motor move their geometric axes towards or away from those of their respective rotors; this effect will vary the ratio between the rotative speed of the rotor of the hydraulic pump and of the rotor of the hydraulic motor.

BRIEF DESCRIPTION OF THE DRAWINGS

The following drawings are illustrative of embodiments of the invention and are not meant to limit the scope of the invention as encompassed by the claims.

FIG. 1 is a perspective, partial sectional view of a body of a variable speed drive assembly in accordance with the invention.

FIG. 2 is a perspective, partial sectional view of the shaft of the hydraulic pump of the variable speed drive assembly in accordance with the invention.

FIG. 3 is a perspective, partial sectional view of the body of the hydraulic pump of the variable speed drive assembly in accordance with the invention.

FIG. 4 is a perspective view of the rotor of the hydraulic pump of the variable speed drive assembly in accordance with the invention.

FIG. 5 is a perspective view of the port plate for the hydraulic pump of the variable speed drive assembly in accordance with the invention.

FIG. 6 is a perspective view of the port plate for the hydraulic motor of the variable speed drive assembly in accordance with the invention.

FIG. 7 is a perspective view of the rotor of the hydraulic motor of the variable speed drive assembly in accordance with the invention.

FIG. 8 is a perspective, partial sectional view of the body of the hydraulic motor of the variable speed drive assembly in accordance with the invention.

FIG. 9 is a perspective, partial sectional view of a cover of the variable speed drive assembly in accordance with the invention.

DESCRIPTION OF A PREFERRED EMBODIMENT

Figure 10:
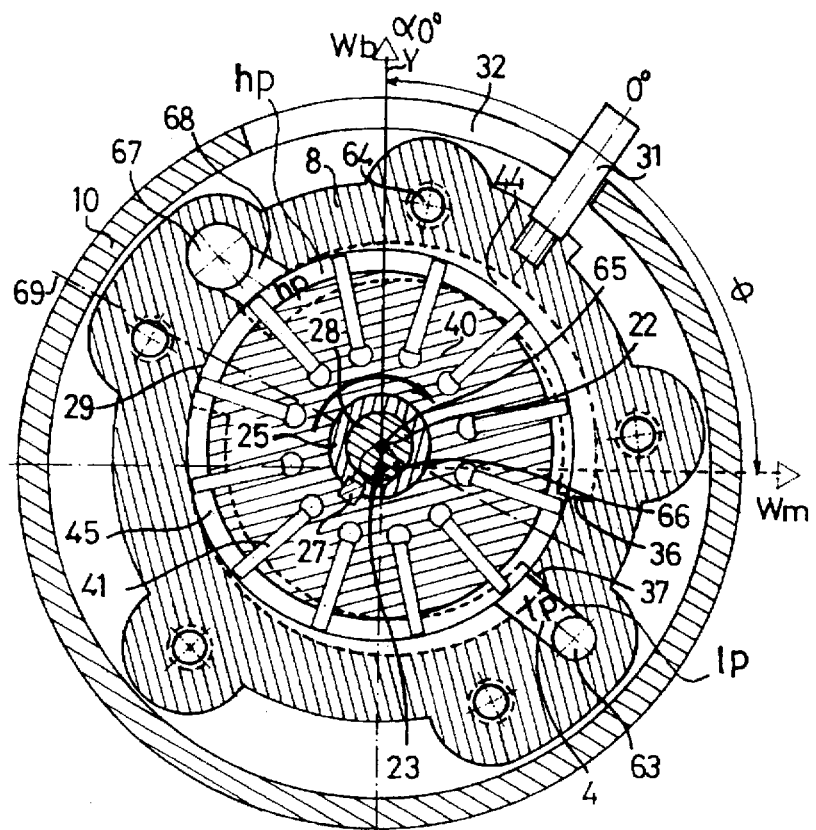
FIG. 10 is a cross-sectional view taken along the line 10—10 in FIG. 26 when the variable speed drive assembly is in a first operating position.

In order to clarify the main concepts which characterize and substantially modify this type of machines, some sheets of drawings are appended to this specification, showing the most essential features of the present invention by way of non-limiting example, in order to describe and clarify its operation.

FIGS. 1 to 9 show an exploded and diagrammatic perspective view of a particular variable speed device which, being representative of the innovations in the machines of this type, is used as clarifying example.

The assembly of the housing is represented in FIG. 1 by its body 10 and in FIG. 9 by its cover 11, which is fitted to the body by means of bolts 12 screwed in 13. This assembly, static with respect to the outside, is provided with two opposite side openings, into which are received two corresponding double-eccentric bearings, namely element 14 in FIG. 1 and 15 in FIG. 9. Apart from being fitted therein, their rotation is prevented by key 16 of FIG. 1 and a corresponding one in FIG. 9 (not visible). Both bearings are similar, and are in line with each other. This bearings, whose outer cylindrical portions 17 and 102 of FIGS. 1 and 9 are arranged in the inner portion of the housing assembly, are closely in contact with surfaces 18 and 103 of FIG. 3 and are also closely in contact with surfaces 19 and 104 of FIG. 8; therefore, and since the latter surfaces are a part of the variable drive assembly and this is an integral assembly, the only movement it will be allowed will be the rotation about the geometrical axis 23 of said cylindrical surfaces 17,18, 19,102,103 and 104. The double-eccentric bearings are also provided with inner cylindrical openings, 14' in FIG. 1 and 15' in FIG. 9, aligned with each other and having a common geometrical axis 22, parallel and separated a distance E with respect to the geometrical axis 23. This distance E, which is always constant, will be hereinafter indicated as eccentricity parameter. This inner cylindrical surfaces will be respectively in close contact with the shafts of the rotors of the hydraulic pump and of the hydraulic motor. Section 20 of FIG. 2, belonging to the shaft of the rotor of the hydraulic pump, is arranged with a close fit into the inner cylindrical opening 18 of FIG. 1, section 24 of the same figure remaining outside the housing for coupling with the driving mechanism so that it will turn freely about the geometrical axis 22. Section 21 of FIG. 8, belonging to the shaft of the rotor of the hydraulic motor, is arranged with a close fit into the inner cylindrical opening 19 of FIG. 9, section 88 of FIG. 8 remaining outside the housing for coupling with the transmission element, being also able to turn freely about the same geometrical axis 22. It is very important to notice that both shafts are concentric and can turn independently from each other. This is because the shaft of the rotor of the hydraulic motor is arranged within the shaft of the rotor of the hydraulic by its cylindrical surface 28 of FIG. 8 being received within recess 26 of FIG. 2, which is the inner cup-shaped part of section 25 of the shaft of the rotor of the hydraulic pump. The rotor of the hydraulic pump, represented by element 40 of FIG. 4, forms an integral body with its shaft by virtue of the fact that the latter is fitted closely in the former, in opening 82 of FIG. 4, and more precisely in keyway 42 of the same figure, by means of key 27 of FIG. 2. It must be noted that in this particular case said rotor is provided with 12 vanes, namely elements 41 of FIG. 4; other variable speed drives of this type may have a different number of vanes. Similarly, the rotor of the hydraulic motor, represented by element 50 of FIG. 7, is integral with its shaft 53 by virtue of the latter being arranged in a close fit into opening 52 of FIG. 7, by means of the introduction of key 89 of FIG. 8 in keyway 54. In this particular case the rotor of the hydraulic motor is provided with 10 vanes, namely element 51 in FIG. 7; other variable speed drives of this type may have a different number of vanes. Thus, it can be seen that the rotor of the hydraulic pump, the rotor of the hydraulic motor and their respective shafts all have axis 22 as a common geometrical axis, this axis being static with respect to the outside, parallel to geometrical axis 23, which is also static with respect to the outside, and arranged at a distance E therefrom.

Both rotors are arranged within the variable drive assembly, which is constituted by a number of integral parts that, as stated above, have all their movements prevented except from rotation about geometrical axis 23. The elements constituting the variable drive assembly will now be described.

Element 8 of FIG. 3 is the body of the cylinder of the hydraulic pump, and is part of the variable drive assembly. The cylinder itself 29 of FIG. 3, the side cover 30 of the same figure, and the port plate 38 of FIG. 5 enclose the pump's rotor 40 of FIG. 4. The rod 31 of FIG. 3, which protrudes from the housing through slot 32 of FIG. 1, is also a part of the variable drive assembly; its operation will cause the whole variable drive assembly to turn around its mentioned geometrical axis 23. This part of the variable drive assembly is joined to the port plate, which is represented in FIGS. 5 and 6 and will be described below, and also to the body of the cylinder of the hydraulic motor and its cover, represented in FIG. 8. This joint is carried out by means of the bolts 33 of FIG. 8 which lock the whole variable drive assembly together by passing through the bores 35 and 34 of FIGS. 6 and 5 and screwing in the bores 64 of FIG. 3. Recesses 36 and 37 of the cylinder of the hydraulic pump can be seen in FIG. 3, respectively in register with the port openings 44 and 45 of FIG. 5, and having the function of homogenizing the set of chambers formed by the vanes of the rotor of the hydraulic pump and connected with the outlet of fluid at one end, and at the same time homogenizing the set of chambers also formed by the vanes of the rotor of the hydraulic pump and connected with the return of fluid at the other end; they furthermore favour as much as possible the flow of fluid between the hydraulic pump and the hydraulic motor. Formed in the cover 30 of the cylinder of the hydraulic pump are two blind ports 113 and 114, respectively facing ports 44 and 45, to further promote homogenizing of the high and low pressure chambers.

Element 9 in FIG. 8 represents the body of the cylinder of the hydraulic motor, which is also a part of the variable drive assembly. Note that cylinder 39 of FIG. 8, its side cover 55 of the same figure, and the port plate 43 of FIG. 6, enclose the rotor 50 of FIG. 7. Recesses 56 and 57 of the cylinder of the hydraulic motor can also be seen in FIG. 8, respectively in register with the port openings 46 and 47 of FIG. 6, and having the function of homogenizing the set of chambers formed by the vanes of the rotor of the hydraulic motor connected with the inlet of fluid at one end, and at the same time homogenizing the set of chambers formed by the vanes of the rotor of the hydraulic motor connected with the return of fluid at the other end; they furthermore favour as much as possible the flow of fluid between the hydraulic pump and the hydraulic motor. Formed in the cover 55 of the cylinder of the hydraulic motor are two blind ports 115 and 116, respectively facing ports 46 and 47, to further promote homogenizing of the high and low pressure chambers.

It can be seen that the set of chambers of the hydraulic pump in contact with the outlet port 44 of FIG. 5 and the set of chambers of the hydraulic motor in contact with the same port 46 of FIG. 6, together with the passage represented by the outlet port itself, its geometry, and the recesses 36 of FIG. 3 and 56 of FIG. 8, form a single chamber, so that the flow of fluid from the hydraulic pump to the hydraulic motor is as smooth as possible; this is also due to the fact that both rotors always rotate in the same direction, although at different speed, the inertia of the fluid itself being thereby fully exploited.

In the port plate 38 of FIG. 5 is also shown the collector 105, whose arc extends approximately from the beginning to the end of the low pressure port 45, the exact position of its ends being determined by the geometry of the bores 106 formed at the basis of the vanes of the hydraulic pump. Said collector 105 is in communication through the hole 108 of FIG. 5 with the passage 100 of FIG. 6, which in turn links the high pressure ports 44 and 46 with the central openings 48 and 49. Therefore, said collector 105 will be at high pressure, as will be the heads of the vanes of the hydraulic pump that are located in this region, because said bores 106 will be permanently in contact with the collector 105 while the vanes are in the high pressure region. Similarly, in the hidden face of FIG. 6 there will be another collector like collector 105, whose arc will extend approximately from the beginning to the end of the low pressure port 47, the opening of its ends being corrected depending on the geometry of bores 107 formed at the basis of the vanes of the hydraulic motor. Said collector is in turn in communication through hole 109 of FIG. 6 with passage 100, so that this collector will be at high pressure, and so will be the heads of the vanes of the hydraulic motor that are located in this region.

Another collector 111, in FIG. 3, is located in the side wall 30 of the cylinder of the hydraulic pump, spanning an angle approximately like that of the low pressure port 45; its angle is such that the sum thereof to the aperture angle of collector 105 will be approximately 360 sexagesimal degrees. This angle will be corrected depending on the geometry of the bores 106. This collector 111 is in communication with the low pressure chamber by means of a passage, not visible in this perspective view, that will be described below. In consequence, the heads of the vanes of the hydraulic pump that are located in the low pressure region will also be at low pressure, because in this region bores 106 will be permanently in contact with collector 111. Similarly, the collector 112 of FIG. 8 is formed in the side wall 55 of the cylinder of the hydraulic motor, spanning an angle approximately equal to the angle of the low pressure port 47, and such that the sum of this angle with that of the high pressure collector of the hydraulic motor, described above and not visible in FIG. 6, will be of approximately 360 sexagesimal degrees. This angle will be corrected depending on the geometry of bores 107. This collector 112 is in communication with the low pressure chamber by means of a passage, not visible in this perspective view and that will be described hereinafter. Therefore, the heads of the vanes .of the hydraulic motor that are located in the low pressure region will also be at low pressure, because the bores 107 will be permanently in contact with the collector 112 in this region.

Similarly, it can be noted that the set of chambers of the hydraulic pump in contact with the return port 45 of FIG. 5 and the set of chambers of the hydraulic motor in contact with the same port 47 of FIG. 6,together with the passage represented by the return port itself, its geometry, and the recesses 37 of FIG. 3 and 57 of FIG. 8, form a single chamber, so that the flow of fluid from the hydraulic pump to the hydraulic motor is as smooth as possible; this is also due to the fact that both rotors always rotate in the same direction, although at different speed, the inertia of the fluid itself being thereby fully exploited.

Figure 29:
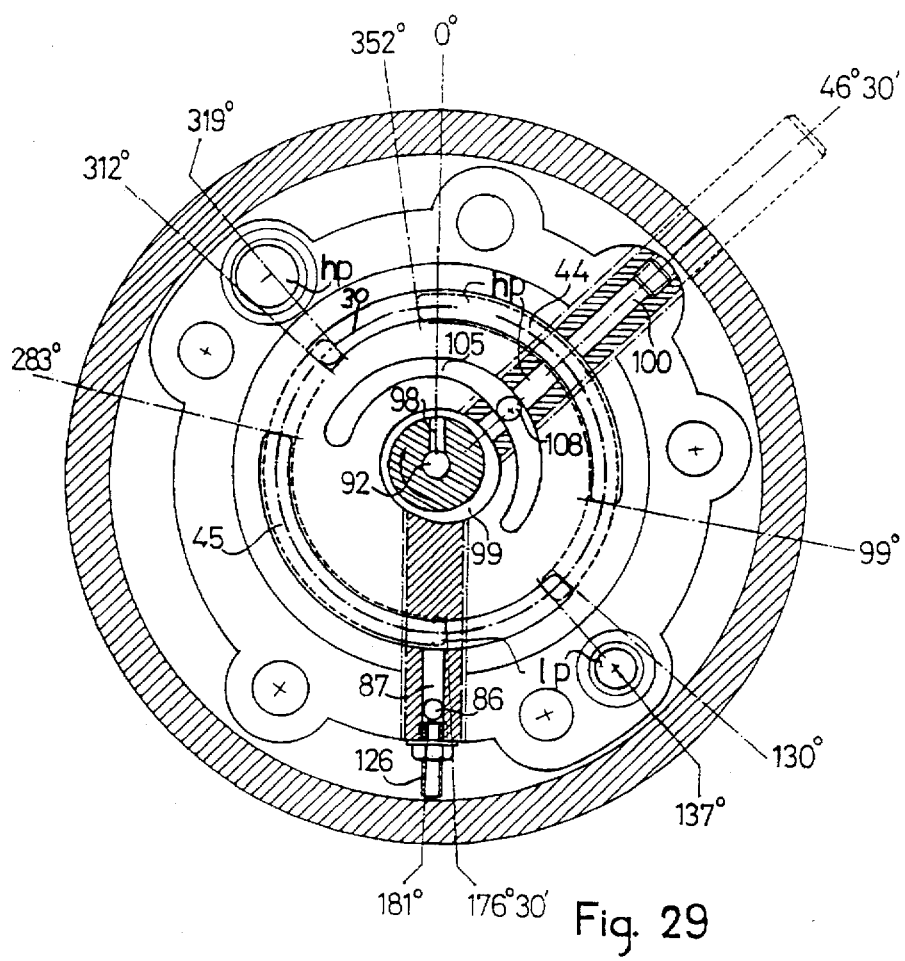
FIG. 29 is a cross-sectional view taken along the line 29—29 of FIG. 26.
Figure 30:
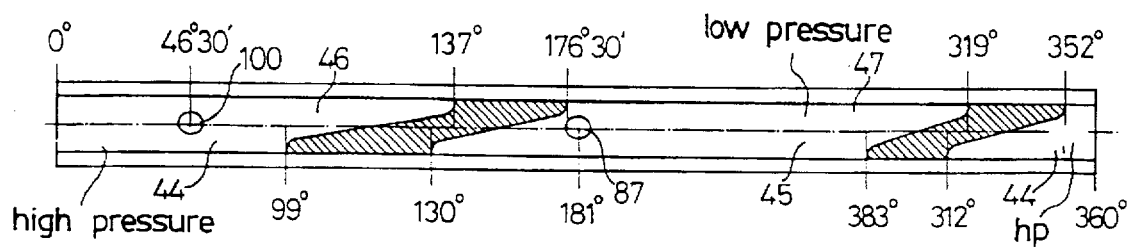
FIG. 30 is a sectional view developed along line 30 in FIG. 29.

Regarding the port plate, also integral with the variable drive assembly, to which reference has been made so far in relation with FIGS. 5 and 6, it has to be pointed out that normally this plate is in one piece, and not double, and its development following line M of FIG. 29 is represented in FIG. 30. It has been represented here in double form in order to facilitate the description, because the port openings in the region of the hydraulic pump, 44 and 45 of FIG. 5, are phase shifted with respect to their outlets, 46 and 47 of FIG. 6. In the port plate are provided central openings 48 and 49, intended to receive the shaft 28 of FIG. 8; their shape is elongate because otherwise, upon rotation of the variable drive assembly with respect to said geometrical axis 23, parallel and spaced apart a distance E from the common geometrical axis 22 of the two rotors, the surface 28 of the shaft of the hydraulic motor would contact the walls of the openings, thus preventing rotation. It has to be remembered that the port plate is also a part of the variable drive assembly which, as stated above, is an integral set of parts.

A by-pass is also provided, intended to communicate the high pressure chamber of the hydraulic motor by means of the inlet 5 of FIG. 8 with the low pressure chamber of the hydraulic pump through the outlet 4 of FIG. 3, at the starting position $\alpha=0$ of the variable drive assembly. This is achieved in a determined position of the trigger 6 of FIG. 8, attached and fastened to the stem 7 of FIG. 8 by means of the nut 58 of the same figure; this position changes upon engagement of said trigger in the pin 2 of FIG. 9, integral with the housing, which makes it turn and closes the by-pass. The fluid communication between opening 5 of FIG. 8 and opening 4 of FIG. 3 is made through bore 60 of FIG. 8, bore 62 of FIG. 6, bore 61 of FIG. 5 and bore 63 of FIG. 3. The operation thereof will be described later on.

Figure 28:
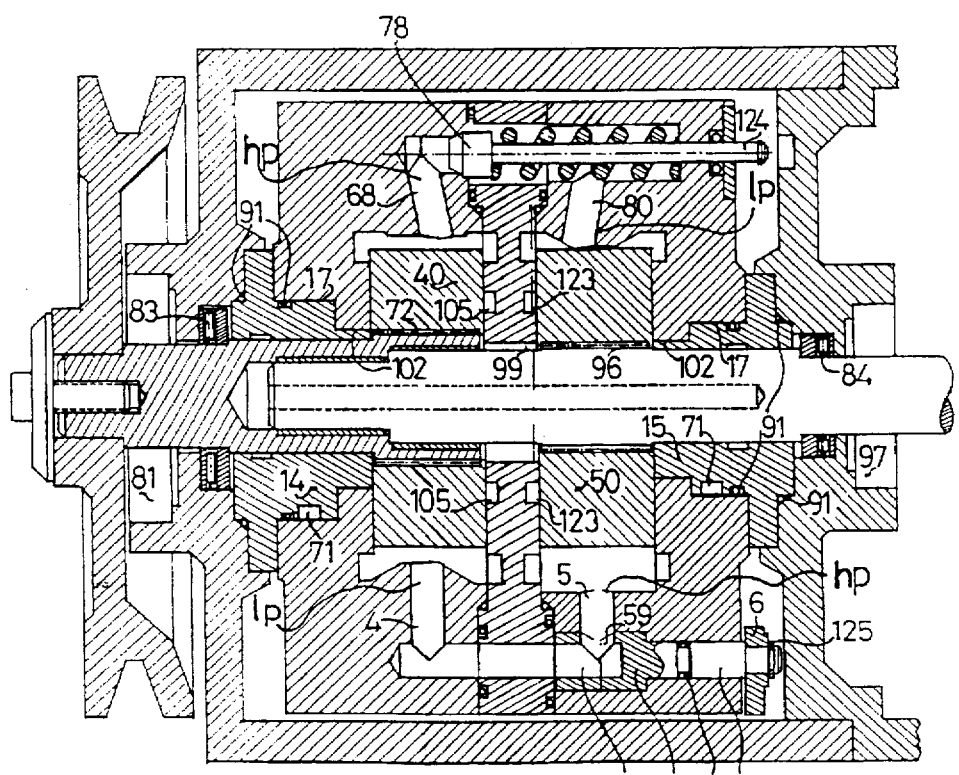
FIG. 28 is a cross-sectional view taken along the line 28—28 of FIG. 25.

In order to avoid complicating the perspective view, the security valve for the relief of any excess of pressure above the operating pressure and the clutch coupled thereto have been omitted in this view. However, both parts are shown in FIG. 28.

Figure 11:
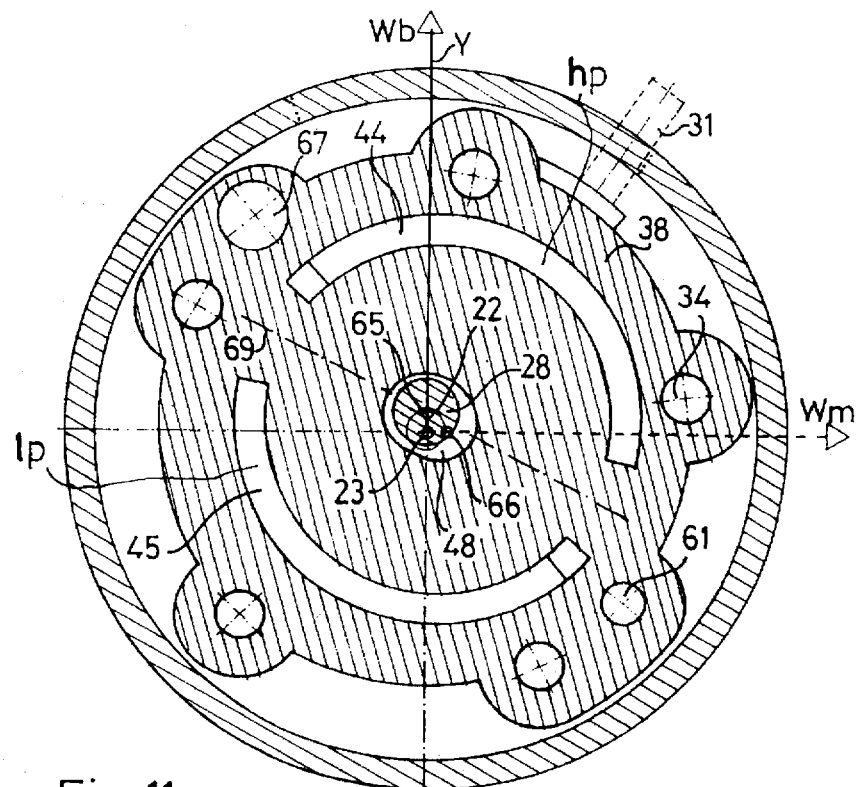
FIG. 11 is a cross-sectional view taken along the line 11—11 in FIG. 26 when the variable speed drive assembly is in the first operating position.
Figure 12:
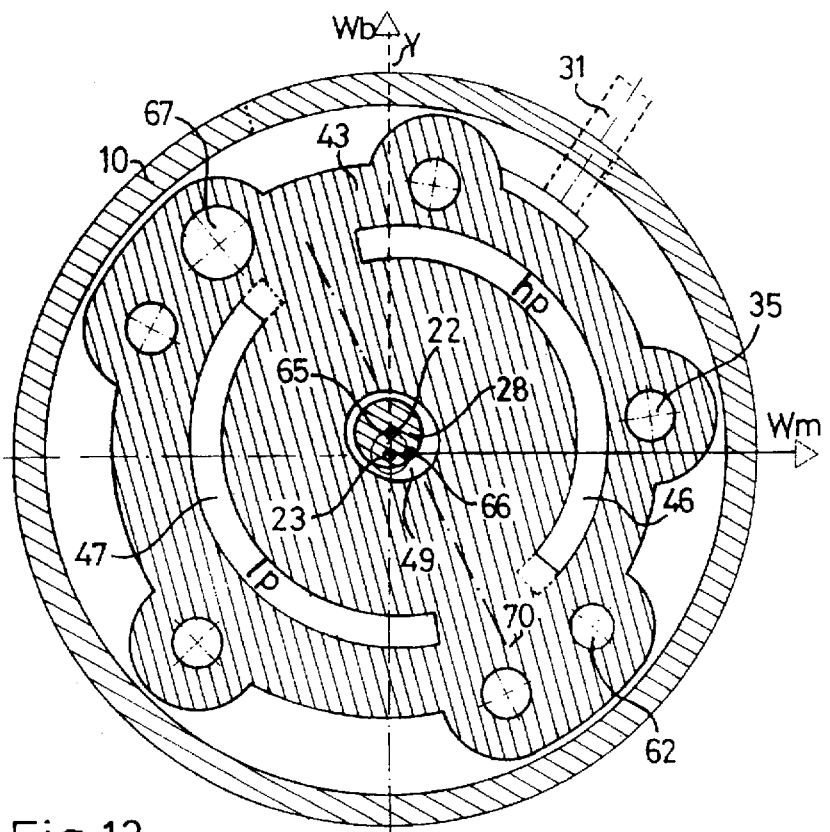
FIG. 12 is a cross-sectional view taken along the line 12—12 in FIG. 26 when the variable speed drive assembly is in the first operating position.
Figure 13:
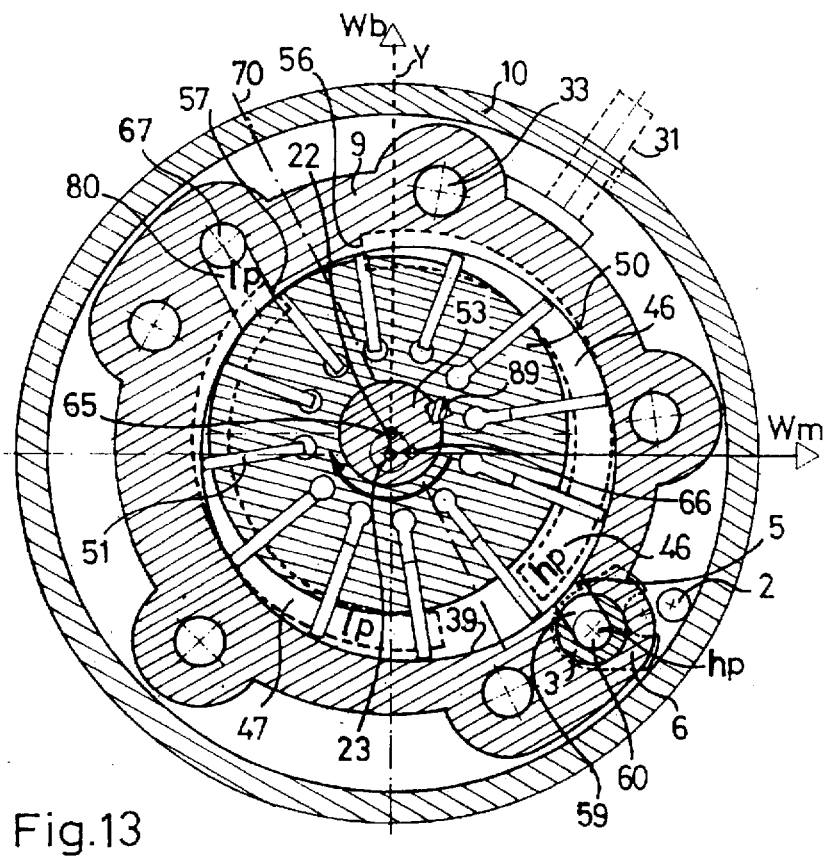
FIG. 13 is a cross-sectional view taken along the line 13—13 in FIG. 26 when the variable speed drive assembly is in the first operating position.
Figure 15:
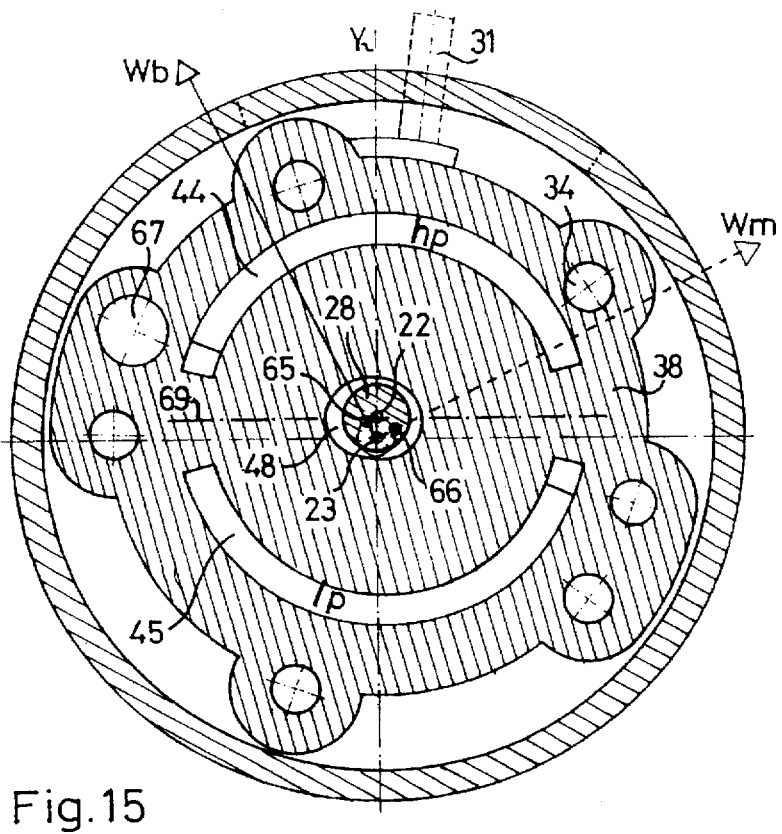
FIG. 15 is a cross-sectional view similar to FIG. 11 when the variable speed drive assembly is in the second operating position.
Figure 16:
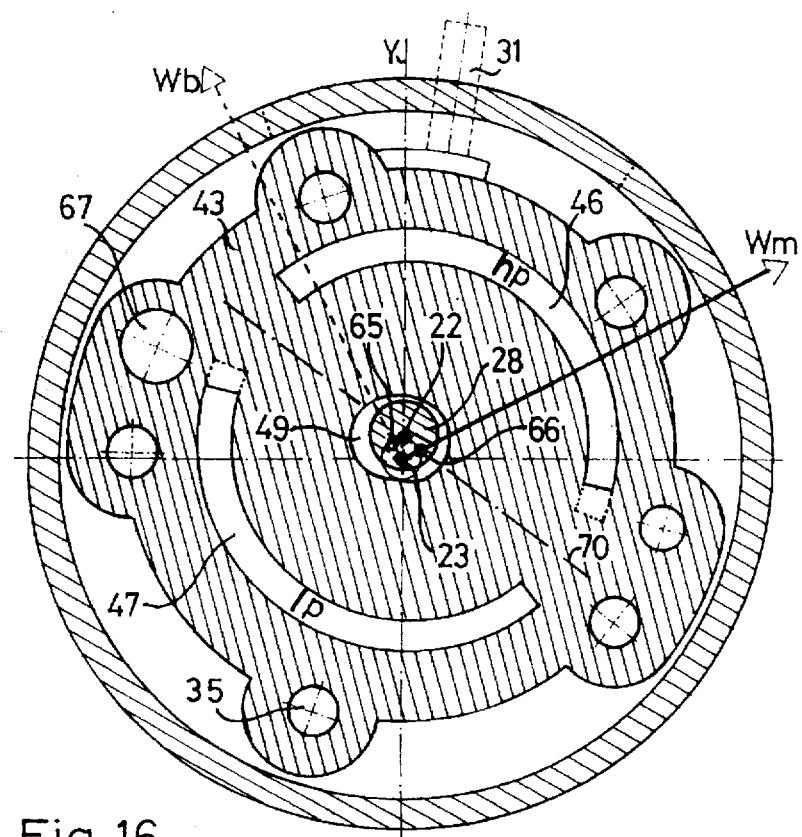
FIG. 16 is a cross-sectional view similar to FIG. 12 when the variable speed drive assembly is in the second operating position.
Figure 17:
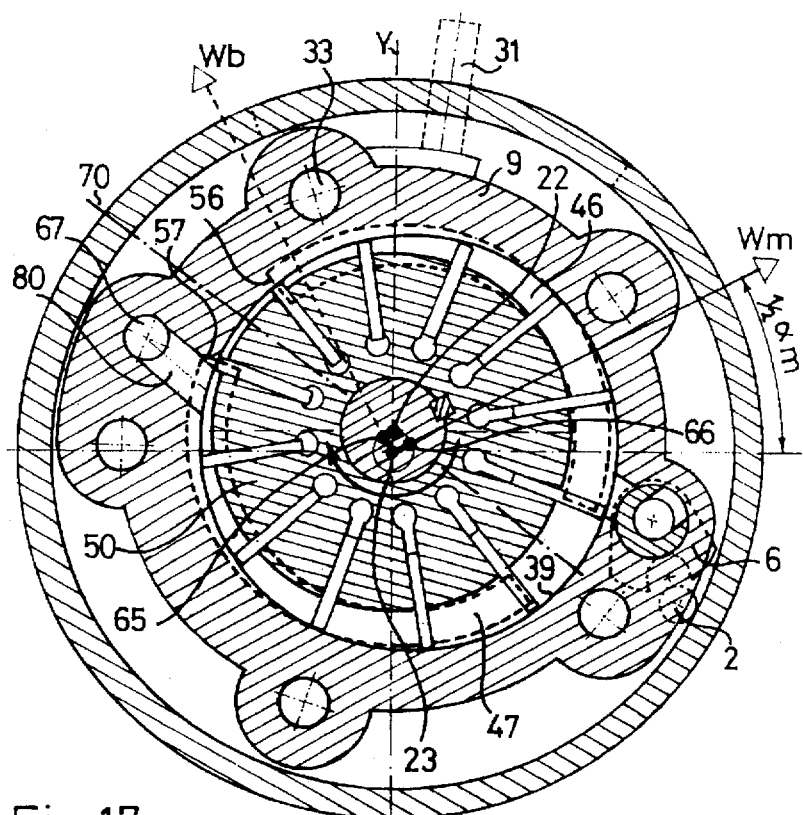
FIG. 17 is a cross-sectional view similar to FIG. 13 when the variable speed drive assembly is in the second operating position.
Figure 19:
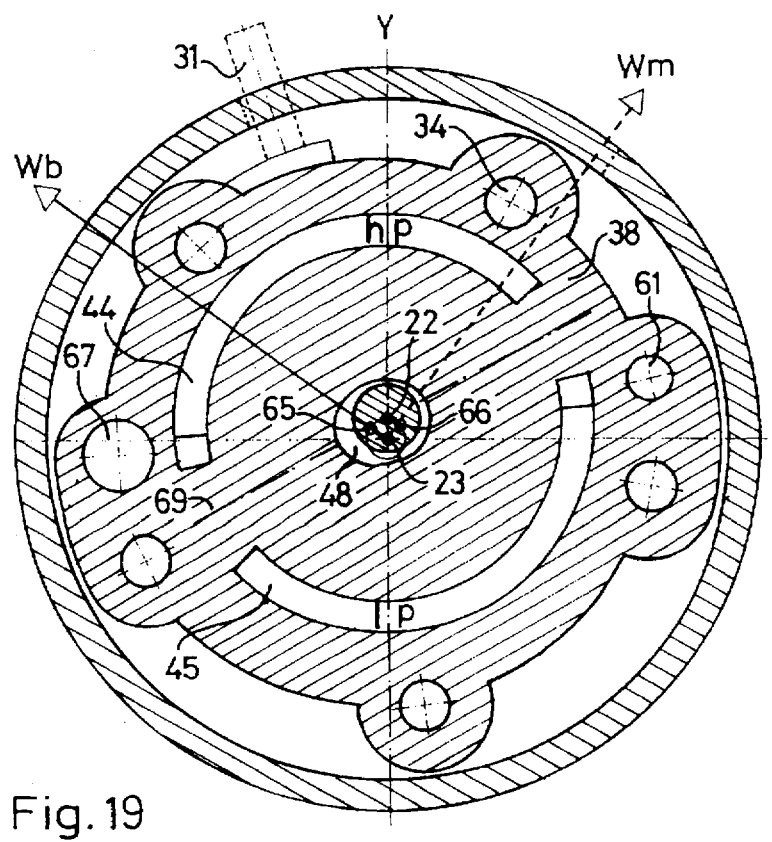
FIG. 19 is a cross-sectional view similar to FIG. 11 when the variable speed drive assembly is in the third operating position.
Figure 20:
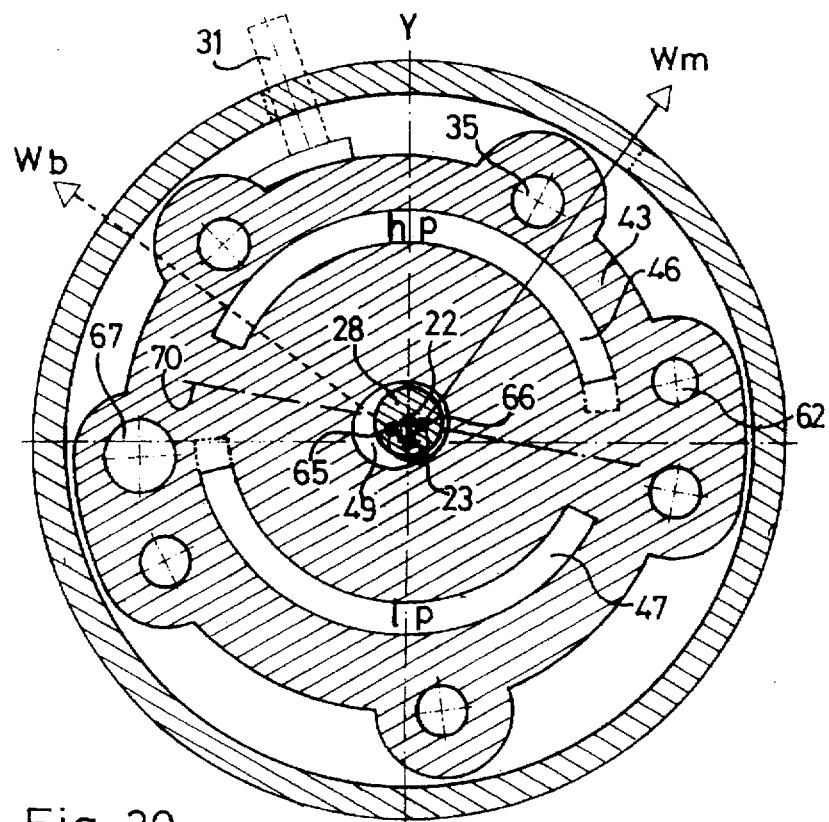
FIG. 20 is a cross-sectional view similar to FIG. 12 when the variable speed drive assembly is in the third operating position.
Figure 21:
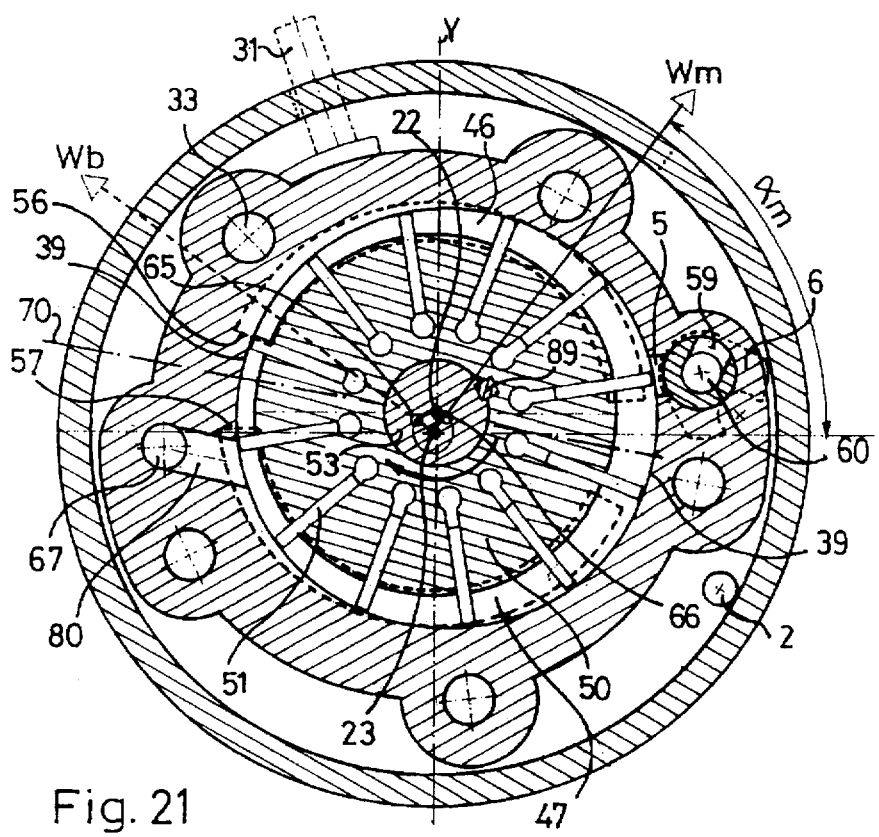
FIG. 21 is a cross-sectional view similar to FIG. 13 when the variable speed drive assembly is in the third operating position.

Three groups of four sections are shown in FIGS. 10 to 21, corresponding to three different working positions of the variable drive assembly. The first group if formed by FIGS. 10,11,12,13, the second group is formed by FIGS. 14,15, 16,17 and the third group is formed by FIGS. 18,19,20,21. For reasons of space, this figures have been divided in six separate sheets. The reference numbers used in these figures to indicate any part, axis, passage, etc. are the same used in the above perspective view, in order to clarify both the elements that are going to be described and their location. It has to be noted that the only difference in this figures is the number of vanes of the rotor 50 of the hydraulic motor, the vanes being twelve, as shown in FIGS. 13,17 and 21, instead of ten as shown in the other figures of the rotor of the hydraulic motor, whereas the rotor of the hydraulic pump shown in FIGS. 7,10,14,18 and 27 has twelve vanes. This variation, within reasonable limits, does not alter the essential aspects of the invention.

The first group of FIGS. 10,11,12, and 13, represents four different transverse cross-sections for the same position of the variable drive assembly, which will be referred to as starting position and corresponds to $\alpha=0$. The second group, similar and constituted by FIGS. 14,15,16, and 17, represents an intermediate position of the variable drive assembly, corresponding to a rotation of $\alpha=0.5*\alpha_M$ of said assembly about geometrical axis 23. Similarly, the third group, constituted by FIGS. 18,19,20, and 21, represents the final position, corresponding to a rotation of $\alpha=\alpha_M$.

Figure 14:
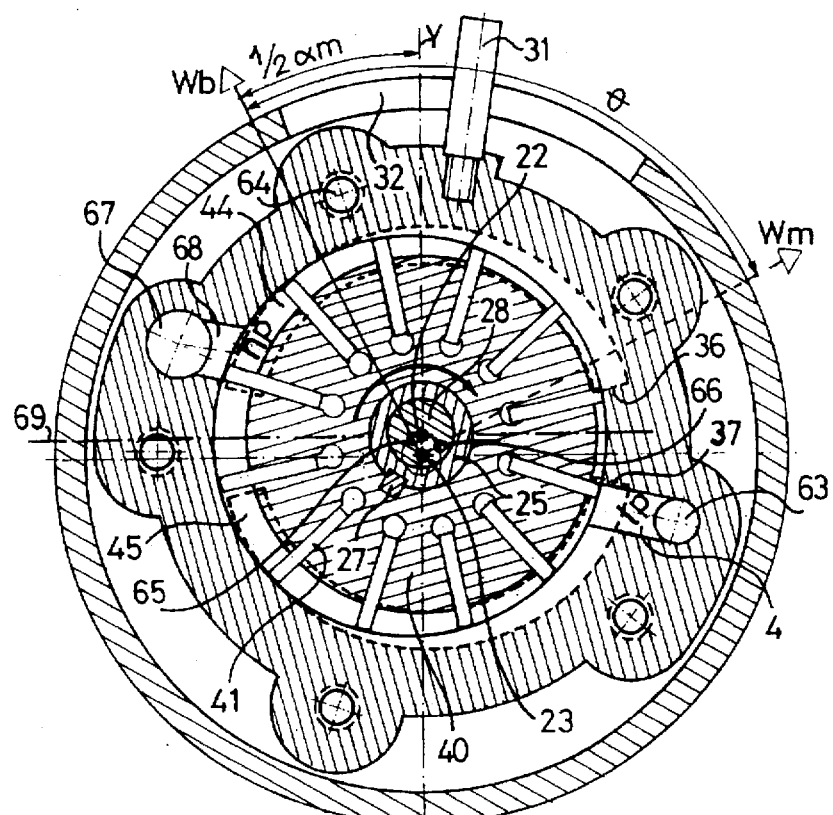
FIG. 14 is a cross-sectional view similar to FIG. 10 when the variable speed drive assembly is in a second operating position.

In the first group, it will be considered that the section of FIG. 10 is located above that of FIG. 11, the latter above that of FIG. 12, and that of FIG. 12 in its turn above that of FIG. 13. Similarly, in the second group FIG. 14 is located above FIG. 15, the latter above FIG. 16, and FIG. 16 in its turn above FIG. 17. Finally, in the third group FIG. 18 is located above FIG. 19, the latter above FIG. 20, and FIG. 20 in its turn above FIG. 21.

In the three groups two imaginary lines Wb and Wm have been plotted, joining respectively the geometrical rotation axis 23 of the variable drive assembly with the geometrical axis 65 of the cylinder of the hydraulic pump and with the geometrical axis 66 of the cylinder of the hydraulic motor. It has to be noted that both the common geometrical axis of the rotors 22 and the geometrical rotation axis of the variable drive assembly 23 are always static with respect to the outside. Therefore, a third imaginary axis, indicated as Y axis, joining the common geometrical axis of the rotors 22 and the geometrical rotation axis of the variable drive assembly 23, remains static in all these figures. Consequently, in any of the figures the angle $\alpha$ turned by the variable drive assembly around the geometrical axis 23 coincides with the angle formed by the imaginary axes Y and Wb.

Figure 22:
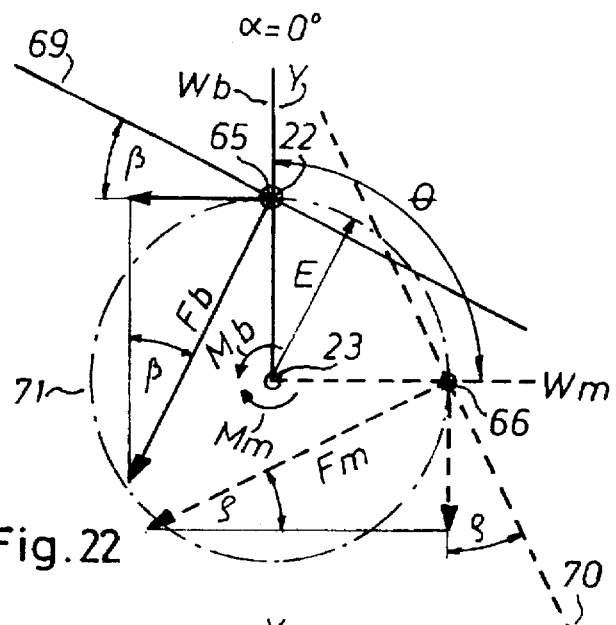
FIG. 22 is a force diagram of the variable speed drive assembly in the first operating position.
Figure 23:
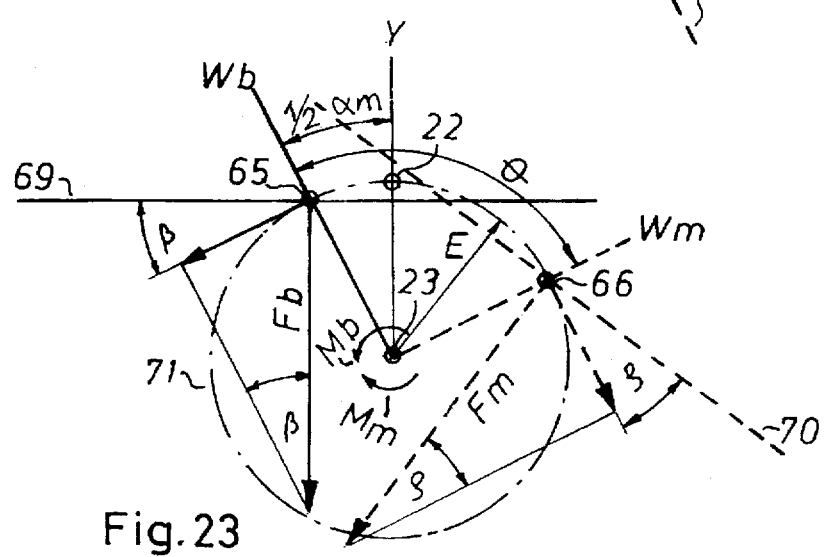
FIG. 23 is a force diagram of the variable speed drive assembly in the second operating position.
Figure 24:
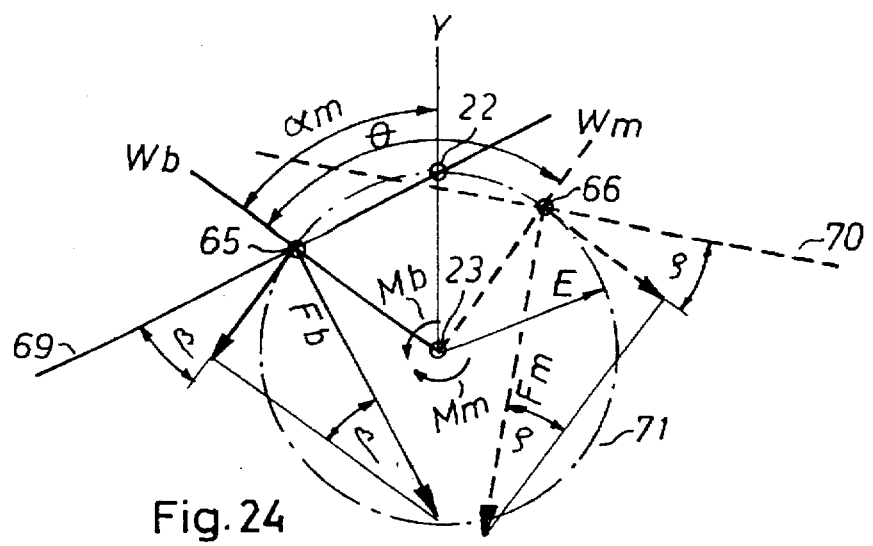
FIG. 24 is a force diagram of the variable speed drive assembly in the third operating position.

The central area of these figures is shown in more detail in the enlarged FIGS. 22,23, and 24.

Figure 18:
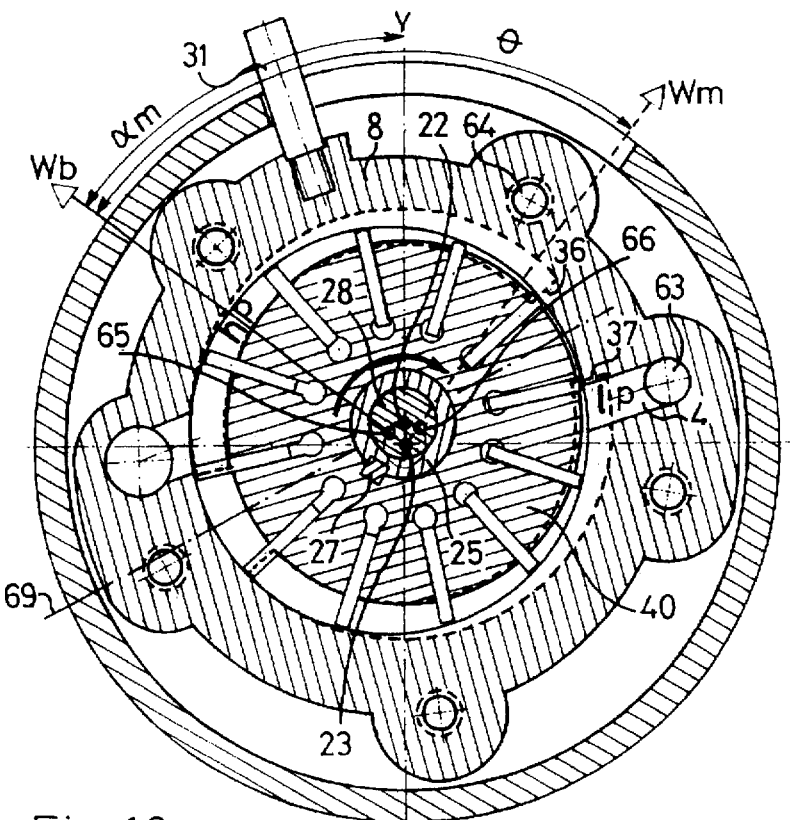
FIG. 18 is a cross-sectional view similar to FIG. 10 when the variable speed drive assembly is in a third operating position.

FIGS. 10,14 and 18 show the same radial section of the hydraulic pump, represented in FIGS. 3 and 4, in the three mentioned working positions. The variable drive lever 31 can be seen in these figures in the three shown working positions, turning around geometrical axis 23 according to the angle $\alpha$ through the slot 32 of the stationary housing 10. The threaded bores 64 joining the body of the cylinder of the hydraulic pump, 8 in FIG. 3, to the rest of the variable drive assembly, and the cylinder 29 of the hydraulic pump, can also be seen. The recesses 36 of the cylinder in the high pressure region 44 and the corresponding recesses 37 in the low pressure regions 45 are also shown, their mission being, as stated before, increasing the section of both sets of chambers, homogenize them and provide an increased section of fluid passage towards the respective outlet and return ports. These recesses coincide with the section of their corresponding ports in the region of contact between them. The rotor 40 of the hydraulic pump and its shaft 25, together with the key 27 intended to fasten the rotor of the hydraulic pump and its shaft, can also be seen. The shaft 28 of the rotor of the hydraulic motor can also be seen: this shaft is internally concentric with the shaft of the rotor of the hydraulic pump and can turn freely therein. In the three figures, the common geometrical axis 22 of the rotors and the geometrical rotation axis 23 of the variable drive assembly are also shown, both static with respect to the outside. The geometrical axis 65 of the cylinder of the hydraulic pump and the geometrical axis 66 of the cylinder of the hydraulic motor have been also represented, even if the latter should not be seen in this three figures, for a better understanding of the operation of the variable drive assembly. It has to be noted that in this version of the variable drive, the distance between the geometrical rotation axis 23 of the variable drive assembly and the geometrical axis 65 of the cylinder of the hydraulic pump, defined before as eccentricity parameter E, is the same distance E' existing between said geometrical rotation axis 23 of the variable drive assembly and the geometrical axis 66 of the cylinder of the hydraulic motor. It is made clear that this last distance can be different from E in versions of the variable drive assembly other than this clarifying example, all the characteristics remaining the same. Moreover, by-pass passage 63 is shown, with its connection to the low pressure chamber, and, similarly, passage 67 of the security valve with its connection 68 to the high pressure chamber can be seen. In other figures, to which reference will be made below, will appear most of the reference numbers described so far, and consequently their explanation will not be then repeated.

FIGS. 13,17, and 21 represent a radial section of the hydraulic motor shown in FIGS. 7 and 8, in the three mentioned working positions. In these figures the lever 31 of the variable drive is shown in dot lines, in the three represented working positions, turning a determined angle α around the geometrical axis 23. The bores and their corresponding bolts 33 joining the body of the cylinder of the hydraulic motor, 9 in FIG. 8, to the rest of the variable drive assembly, can also be seen, as well as the cylinder 39 of the hydraulic motor. The recesses 56 of the cylinder in the high pressure region 46 and the corresponding recesses 57 in the low pressure regions 47 are also shown, their mission being, as stated before, increasing the section of both sets of chambers, homogenize them and provide an increased section of fluid passage from the respective outlet and towards the return ports. These recesses coincide with the section of their corresponding ports in the region of contact between them. The rotor 40 of the hydraulic motor and its shaft 53, together with the key 89 intended to fasten the rotor of the hydraulic motor and its shaft, can also be seen. In the three figures, the common geometrical axis 22 of the rotors and the geometrical rotation axis 23 of the variable drive assembly are also shown, both static with respect to the outside. The center 66 of the cylinder of the hydraulic motor and the center 65 of the cylinder of the hydraulic motor have been also represented, even if the latter should not be seen in this three figures, for a better understanding of the operation of the variable drive assembly.

The passage 60 of the by-pass rotary valve 3, with entrance through 5 and 59 from the high pressure chamber are also shown. Notice also the by-pass trigger 6, whose turning actuates the rotary valve 3, and that in the starting position α=0 of FIG. 13 is in a position such as to put wholly in communication the outlet 5 with the intermediate passage 59. Since the latter is in communication with passages 60,62,61,63 and the outlet 4, in that position there is a full connection between the high pressure region and the low pressure region, so that the rotor of the hydraulic motor can turn freely: this is due to the fact that the fluid the motor displaces, that cannot be absorbed by the hydraulic pump because the latter has its rotor and cylinder concentric and cannot displace any volume, can nevertheless flow through the by-pass. If this by-pass did not exist, the rotor of the hydraulic motor in that starting position would not be able to effect any rotation at all. When a rotation is imparted to the variable drive assembly, the by-pass trigger 6 is forced to engage the pin 2 integral to the housing and, consequently, to turn, such that it actuates said rotary valve 3, and after a few degrees of rotation of the variable drive assembly, the outlet 5 and the intermediate passage 59 are not in communication any more and the by-pass is therefore closed; this can be observed in the intermediate position of FIG. 17 and of course in the final position of figure 21. Once the communication is closed, all the fluid coming from the hydraulic pump through the outlet port 44 and 46 has to be displaced by the hydraulic motor through the return port 47 and 45 towards the hydraulic pump; consequently, the ratio between the rotations of the rotor of the hydraulic pump and the rotor of the hydraulic motor is fixed and a function of the positioning angle α of the variable drive assembly. Similarly, when a rotation is imparted to the variable drive assembly returning it towards its starting position, the by-pass trigger again engages the pin 2, which forces the former to turn in reverse direction to that explained, and therefore to actuate the valve in the opposite direction, placing again in communication the intermediate passage 59 with the outlet 5, so that the by-pass will be opened. The range of rotation of the variable drive assembly in which the aperture or closure of the by-pass are effected can be changed by simply changing the position of the pin 2 of FIG. 9, either by changing its fixed position in the housing or by providing for the possibility of changing said position from the outside. In the variable drive herein described, said pin is fixed. It has to be noted that in some possible applications of this variable drive, it may be interesting not to include the by-pass assembly, so that in the position α=0 the rotor of the hydraulic motor and its shaft will be absolutely blocked, because any movement thereof would imply an expulsion of fluid towards the hydraulic pump, which in this position cannot absorb any volume of fluid, although the rotor of the hydraulic pump will have in this position a complete freedom of rotation.

The inlet passage 80 to the low pressure region can also be observed, in communication with the security valve received within opening 67, that is not shown in FIGS. 10 to 21 but can be seen in FIG. 28. Its function is to absorb any overpressure with respect to that considered as the operating pressure; in case of such an overpressure occurring, the valve that keeps separated the high pressure chamber and the low pressure chamber would actuate and put both chambers in communication, so that the overpressure of the high pressure region would be reduced until the closure of the valve, i.e. until it reaches the maximum operating pressure.

FIGS. 11,15, and 19 represent a section of the port plate at its portion close to the hydraulic pump, shown in FIG. 5, in three different working positions. FIGS. 12,16, and 20 represent a section of the port plate at its portion close to the hydraulic motor, shown in FIG. 6, in three different working positions. It has to be remembered that, as stated before, the port plate is normally a single body, such as shown in diagram 30 that represents a development following line M of FIG. 29. However, in the perspective view and in the sheets containing FIGS. 10 to 21, said plate is shown as being a double plate, in order to better clarify the displacement existing in the port plates between the port region close to the hydraulic pump, openings 44 and 45, and the port region close to the hydraulic motor, openings 46 and 47. In the pairs of FIGS. 11 and 12, 15 and 16, and finally 19 and 20, corresponding to the three positions of the variable drive assembly represented in FIGS. 10 to 21, the rod 31 is also shown in dot lines, even if said rod should not be visible in these sections. It has to be noted that in the starting position, represented in FIGS. 11 and 12, the geometrical axis 65 of the cylinder of the hydraulic pump coincides with the centre 22 of the rotors, so that the axis Wb joining the rotation centre 23 with the centre 65 of the cylinder of the hydraulic pump is overlapped with the Y axis joining the geometrical axis 23 with the common geometrical axis 22 of the rotors. The axis Wm joins the geometrical axis 23 with the geometrical axis 66 of the cylinder of the hydraulic motor. Thus, in the starting position, since the common geometrical axis 22 of the rotors coincides with the geometrical axis 65, the rotor of the hydraulic pump is concentric with its cylinder, and when its shafts forces it to turn it will not displace any fluid volume towards the hydraulic motor through the outlet port, the rotor of the hydraulic motor not being therefore forced to turn. In the intermediate position shown in FIGS. 15 and 16 a rotation has been applied to the variable drive assembly by means of its rod 31, this rotation being equal to half its maximum value: the geometrical axis 65 of the cylinder of the hydraulic pump has thus turned around the geometrical axis 23 an angle of $\alpha=0.5*\alpha_M$, moving away from the geometrical axis 22 of its rotor; upon turning of this rotor, since it is not concentric with its cylinder any more, the hydraulic pump will displace fluid towards the hydraulic motor through the outlet port. Similarly, in this intermediate position, the centre 66 of the cylinder of the hydraulic motor has turned an angle of $\alpha=0.5*\alpha_M$ around the geometrical axis 23, and therefore the cylinder of the hydraulic motor, that in the starting position presented a maximum eccentricity with respect to its rotor, is now in a position closer to concentricity therewith. All the fluid expelled by the hydraulic pump towards the hydraulic motor through the outlet port, 44 and 46, when applying a rotation to its rotor, has to return from the hydraulic motor to the hydraulic pump through the return port, 45 and 47; for this purpose the rotor of the hydraulic motor will be forced to rotate through a determined number of turns, depending on the position of its cylinder at that time with respect to its rotor, whose geometrical axis 22 is static, and that will be different from the rotation of the rotor of the hydraulic pump, except from one determined position. In the final position, when a rotation of $\alpha_M$ has been applied to the lever, corresponding to the situation in which the rotor of the hydraulic pump is almost tangent to its cylinder, the geometrical axis 22 of the rotor of the hydraulic motor is located at a minimum distance from the geometrical axis 66 of its cylinder; in consequence, when a rotation is applied to the shaft of the rotor of the hydraulic pump, the latter will displace a maximum amount of fluid towards the hydraulic motor through the outlet port, and the rotor of the hydraulic motor will have to rotate through a maximum number of turns for each fluid volume unit received from the hydraulic pump, the ratio or relationship between the turns of the rotor of the hydraulic motor and the turns of the rotor of the hydraulic pump being maximum.

The general equation of the relationship between the angular speed $\omega_m(\alpha)$ of the rotor of the hydraulic motor and the angular speed $\omega_b$ applied to the rotor of the hydraulic pump is a function of the angle $\alpha$ defining the position of the variable drive assembly:

$$\omega_m(\alpha) = \frac{H_b R_b \sin(0.5\alpha)\cos(\beta - 0.5\alpha)}{H_m R_m \sin[0.5(\theta - \alpha)]\cos[0.5(\theta - \alpha) - \rho]} \omega_b$$

where $\beta$ is the angle defined between the port bisector 69 of the hydraulic pump in FIG. 22 and the perpendicular to axis $W_b$, and $\rho$ is the angle defined between the port bisector 70 of the hydraulic motor and the perpendicular to axis $W_m$. The port bisectors and the values of $\beta$ and $\rho$ of this particular case will be defined hereinafter. In this equation, $\theta$ is the angle defined by axes $W_b$ and $W_m$, $H_b$ and $H_m$ are respectively the thickness of the hydraulic pump and of the hydraulic motor, and $R_b$ and $R_m$ are respectively the radii of the cylinders of the hydraulic pump and the hydraulic motor.

In this final position the cylinder of the hydraulic motor is not yet concentric with its rotor, because if this should happen, the hydraulic motor would not be able to displace any fluid volume received from the hydraulic pump, and this would result in a collapse of the mechanism. This collapse will not occur for any position $\alpha$ between 0 and $\alpha_M$ provided that $\theta$ is greater that $\alpha_M$. In the particular illustrated case it is necessary to expand the cylinder of the hydraulic motor in order to accommodate the rotor within the cylinder in the starting $\alpha$ positions.

The above description can be better observed in the enlarged illustration of FIG. 22, corresponding to the starting position of the variable drive assembly $\alpha=0$, in which the geometric axis 65 of the cylinder of the hydraulic pump overlaps with the common geometric axis 22 of the rotors, in the enlarged view of FIG. 23 corresponding to the intermediate position of the variable drive assembly $\alpha=0.5 \alpha_M$, and in the enlarged view of FIG. 24, corresponding to the final position $\alpha=\alpha_M$, in which the geometric axis 66 of the cylinder of the hydraulic motor has not yet reached overlapping with the common geometric axis 22 of the rotors, but is in its nearest position therefrom. It has to be noted that in any of the possible positions of the variable drive assembly, the geometric axis 65 of the cylinder of the hydraulic pump and the geometric axis 66 of the cylinder of the hydraulic motor lay on a circumference 71 having a radius E and whose centre is the geometric rotation axis 23 of the variable drive assembly. If the distance between the rotation axis 23 of the variable drive assembly and the center 66 of the cylinder of the hydraulic motor is different (E' different from E), in any of the possible positions of the variable drive assembly the center of the cylinder of the hydraulic motor will lay on another circumference, concentric to 71 and having a radius E'. FIGS. 22,23 and 24 are shown above all for the purpose of better clarifying the calculations that impose that, for any of the possible variable speed drives of the family described herein and object of this patent, the resulting torque on the variable drive assembly with respect to its geometric rotation axis 23 in null, in any operating position, that is, in any position of the variable drive assembly, this corresponding to one of the main claims of this patent.

Note that in FIG. 18 the port bisector in the region of the hydraulic pump has been defined as the imaginary straight line 69 that, in this final position, passes through the center 22 of the rotors and the center 65 of the cylinder of the hydraulic pump. This line 69, which is shifted an angle $\beta=0.5 \alpha_M$ with respect to the horizontal passing through the common geometric axis 22 of the rotors, has been selected in this way because it has been found as the most favourable for the effects sought in this patent, but another line could have been selected. The port bisector 69 of the hydraulic pump is also shown in the enlarged FIGS. 22,23 and 24 by a continuous line with the same numeral; since it is integral in rotation with the variable drive assembly, it will always form the same angle $\beta=0.5 \alpha_M$ with the perpendicular to Wb. In FIGS. 10,14 and 18 it can be seen that the straight line dividing the high and low pressure regions in the hydraulic pump will swing a number of times equal to the number of chambers for each revolution of its rotor with respect to said bisector 69, such that it can be considered that said straight line, the port bisector of the hydraulic pump, is the line dividing the high and low pressure regions in the hydraulic pump. Examining FIGS. 22,23 and 24, it can be seen that the resultant of the high pressures of the hydraulic pump on the variable drive assembly will be a vector having a magnitude Fb and the direction and sense shown in the drawing, that passes through the center 65 of the cylinder of the hydraulic pump and is at right angles to the port bisector 69 of the hydraulic pump. Since its magnitude is known and equal to:

Fb=2 Hb Rb P

Hb being, as stated before, the thickness of the hydraulic pump, Rb being the radius of the cylinder of the hydraulic pump and P being the high pressure of the fluid at that instant, said force produces as a reaction on the outside only a torque, with respect to the geometric rotation axis 23 of the variable drive assembly, that is equal to:

$$Mb = E\ Fb\ \sin(\beta) = E\ Fb\ \sin(0.5\ \alpha_M)$$

Assuming that the port bisector 70 of the hydraulic motor is already defined, and since it has to pass through the centre 66 of the cylinder of the hydraulic motor and is shifted an angle $-\rho$ with respect to the perpendicular to Wm through 66, the resultant force of the high pressures on the variable drive assembly due to the hydraulic motor will be a vector Fm which, passing through 66, will have a magnitude of:

$$Fm = 2\ Hm\ Rm\ P$$

Hm being, as stated before, the thickness of the hydraulic motor, Rm being the radius of the cylinder of the hydraulic motor and P being the high pressure of the fluid at that instant, because we disregard the possible pressure losses in the passage from the hydraulic pump to the hydraulic motor in the high pressure chamber, since there is practically no choke between them. Said force Fm produces with respect to the outside a torque with origin in the geometric rotation axis 23 of the variable drive assembly and equal to:

$$Mm = -E'\ Fm\ \sin(\rho)$$

If now we impose as main condition that the resultant torque with respect to the variable drive assembly be null, we obtain that:

$$E\ Fb\ \sin(0.5\ \alpha_M) - E'\ Fm\ \sin(\rho) = 0$$

and therefore:

$$\rho = \arcsin(E\ Fb\ \sin(0.5\ \alpha_M)/(E'Fm))$$

and substituting the respective values of Fb and Fm, we obtain:

$$\rho = \arcsin(E\ Hb\ Rb\ \sin(0.5\ \alpha_M)/(E'Hm\ Rm))$$

And in case that the distance E' between the geometric axis 66 of the cylinder of the hydraulic motor and the common geometric axis 22 of the rotors is equal to the eccentricity parameter E, observing FIGS. 22,23 and 24 the equation will be reduced to:

$$\rho = \arcsin(Hb\ Rb\ \sin(0.5\ \alpha_M)/(Hm\ Rm))$$

Thus, in the practical embodiment of this invention, by imposing these conditions the resultant torque upon the variable drive assembly will tend to be practically null, in any of the positions thereof.

The port bisector of the hydraulic motor will always have to be shifted said angle $-\rho$ for a displacement of the port bisector of the hydraulic pump of $\beta = 0.5\ \alpha_M$, thereby achieving that in any position of the variable drive assembly the resultant torque thereupon will be null, independently from the speed of rotation of the rotor of the hydraulic pump. For a value of B different from that chosen in the particular example showing the appended drawings, another value of p would have been chosen such to maintain that in any position of the variable drive assembly the resultant torque thereupon is null.

A variable speed drive that could be applied, amongst others, to a cooling group for the automotive industry, is shown by way of clarifying example in FIGS. 25 to 30. The same reference numerals described previously have been used in these figures; therefore, the explanations will not be repeated, and only the additional elements shown in said figures, that without changing the essentiality of the invention will nonetheless assist in the comprehension of the mechanisms within the assembly, will be cited.

Figure 25:
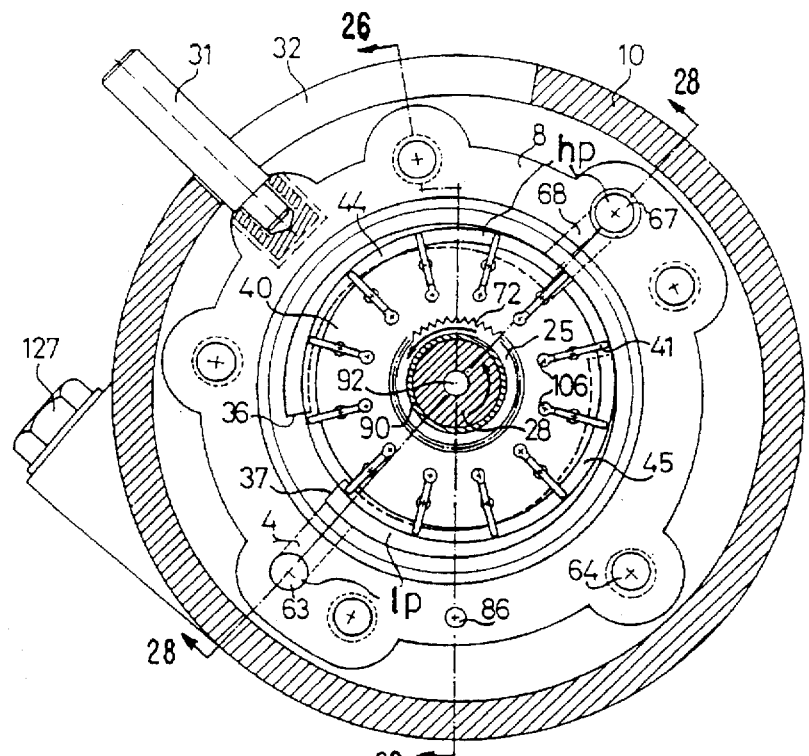
FIG. 25 is cross-sectional view taken along the line 25—25 of FIG. 26.
Figure 26:
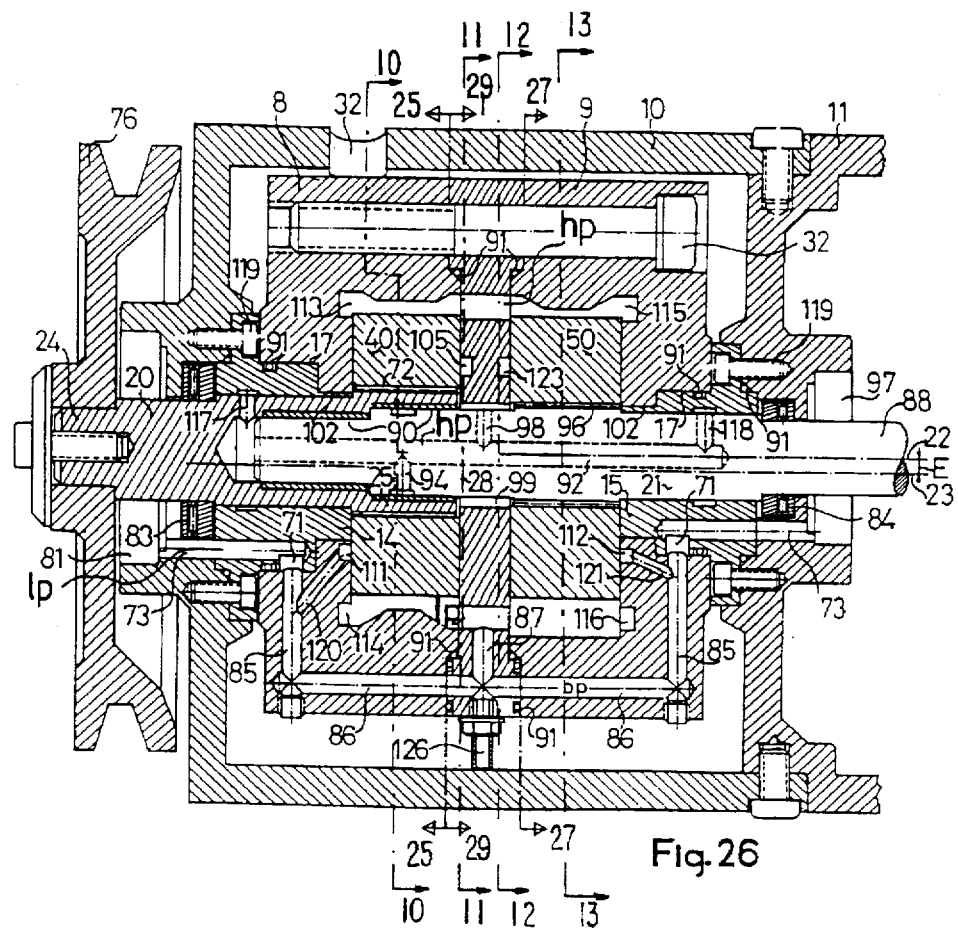
FIG. 26 is a cross-sectional view taken generally along the line 26—26 of FIG. 25.

FIG. 26 shows a longitudinal section of the variable speed drive along line A-B-C-D of FIG. 25. FIG. 28 shows a longitudinal section of the variable speed drive along line E-F of FIG. 25.

Figure 27:
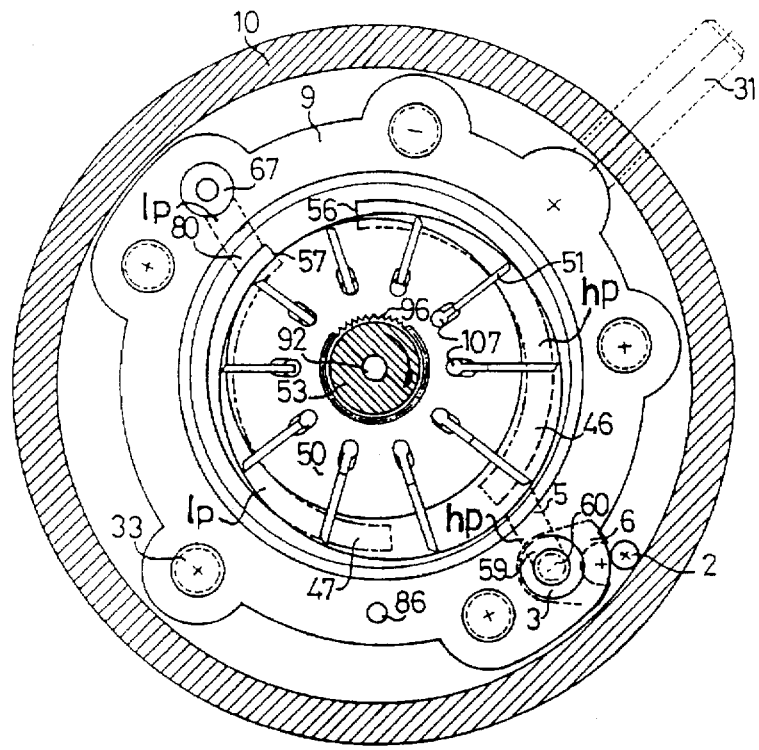
FIG. 27 is a cross-sectional view taken along the line 27—27 of FIG. 26.

FIG. 25 is an open view of the hydraulic pump along line G-H shown in FIG. 26. It has to be noted that the orientation of this view is opposed to that of the sections shown in FIGS. 10,14 and 18. In said view 25, the couplings 40 and 50 of the rotor with its shaft 25 by means of keys 27 and 89 have been substituted by splined couplings, 72 and 96, having the same function but allowing an improved distribution of the stresses suffered by said coupling. The shaft 28 of the hydraulic motor can also be appreciated, turning freely and concentrically within the shaft 25 of the rotor of the hydraulic pump by virtue of the bearings 90. FIG. 29 is a view along line I–J of FIG. 26, but towards the opposite side as compared to FIG. 25, the port plate being here shown. The orientation of this figure is the same as that of FIGS. 10 to 21. Similarly, FIG. 27 is an open view of the hydraulic motor along line K–L of FIG. 26, which in this case is oriented exactly like the sections of the hydraulic motor shown in FIGS. 13,17 and 21. In this figures, the coupling of the rotor 50 with its shaft 53 by means of key 59 is substituted with a splined coupling 96, having the same function but an improved distribution of the stresses.

FIG. 26 shows the pulley 76 that will be connected to any driving system. Said pulley is integral with the shaft 24 of the hydraulic pump. The recesses 81 and 97 for the fluid retainers placed at both ends of the housing and whose mission is that of sealing the assembly. This figure also shows a number of O-rings, all of them identified with the reference 91, having the mission of sealing off the possible leaks of fluid that could occur between parts, both rotary or not. In the central region of the shaft 21 of the hydraulic motor, inwardly and concentrically thereto, a passage 29 is shown, having the mission of letting fluid at high pressure therethrough, lubricating the friction bearings 90 and the double-eccentric bearings 14 and 15, through bores 117 and 118. The inlet of high pressure into said passage 92 occurs through passage 98, that sets it in communication with the central cavity of the port plate, which before was 48 and 49 when the plate was shown as comprising two bodies, and now is single and identified with the reference numeral 99. In its turn, the communication from this cavity 99 to the high pressure region is effected through the radial passage 100, that extends within the port plate and is shown in the view of FIG. 29. The fluid that could escape from the double-eccentric bearings 14 and 15, between their shafts and their seat, could result in a harmful axial thrust on the retainers received within recesses 81 and 97, since this fluid is at high pressure. In order to avoid this, the space remaining between the retainers and their bottom wall has been put in communication with the low pressure chamber through passages 73 and 71, which are static because they are received in the double-eccentric bearings 14 and 15. This passage 71 is a slot formed in the cylindrical periphery of the bearings 17, where the variable drive assembly turns on both sides, with an angular opening slightly greater than $\alpha_M$, in order that passage 85, when rotating on said slot 71, can coincide thereon in all the path of its rotation without interrupting the fluid flow. This passage 85 is in turn connected to passages 86 and 87 that put it in communication with the low pressure chamber, the leaked fluid being thereby recovered and passing in its turn to low pressure.

The pressure existing in the core of the shafts 20 and 21 generates a strong thrust between them, that tends to separate them axially and that will be absorbed by the axial needle bearings 83 for the shaft of the hydraulic pump and 84 for the shaft of the hydraulic motor.

FIG. 26 also shows the high pressure collector 105 which overlaps with the bores 106 at the base of the vanes in FIG. 25, with an aperture that extends from the trailing end of the low pressure port. 45 to its leading end, but measured on the opposite side, taking also into account the diameter of the bores formed at the base of the vanes in order to correct said aperture, as described above. This collector will be more clearly understood from FIG. 29, where there is also shown its communication with the high pressure chamber through bore 108, which is in communication with passage 100 joining the high pressure ports 44 and 46 with the central cavity 99 of the port plate. On the face opposite to that of FIG. 29 there is a second collector, similar but phase shifted with respect to the previous one, not visible in FIG. 29 but shown in FIG. 26 with the reference numeral 123; it will not be further described because it has a similar function and it has been described above. In FIG. 26 are similarly shown the collectors 111 and 112 at the base of the vanes in low pressure, having an aperture that added to that of the high pressure collectors 105 and 123 gives about 360 sexagesimal degrees, its aperture being corrected depending on the diameters at the base of the vanes. These collectors at the base of the vanes are in communication with the low pressure chambers by means of the passages 120 and 121 through the passages 85,86 and 87. These have also been already mentioned and will not be described further.

FIG. 28 shows the discharge or security valve, which, in case that the fluid pressure in the high pressure region exceeds the maximum allowable pressure, will put in communication the high pressure region through passage 68 and the low pressure region through passage 80, such that pressure will again be reduced to the maximum allowable value, said communication being thereafter interrupted again. Its explanation will not be further broadened, since we believe that its operation is clear enough in FIG. 28. In this figure the keys 16 of FIG. 1 have been replaced with the bolts 119 of FIG. 26, with the same function but a more efficient fastening action. The nut 58 of the rotary valve of FIG. 9 has been replaced in FIG. 28 with an outer elastic security ring, indicated by the reference numeral 125. The same figure also shows the stem 124 which, by means of any mechanism, pulls it outwards opening the security valve 78 with an effect similar to declutching.

FIG. 25 shows the cap 127 for filling in the compensation fluid, having an incorporated level rod, not visible in this section, the bore 126 of FIGS. 26 and 29 being the compensation inlet into the variable drive assembly.

The regulator, i.e. the device which is connected to the shaft of the rotor of the hydraulic motor and will actuate the lever of the variable drive assembly in order to force the rotation speed of the rotor of the hydraulic motor to a specific law or to keep it constant, regardless of the rotation speed of the rotor of the hydraulic pump, has been omitted in all the figures. The mechanism actuating on said lever can be very simple. In the figures said regulator has not been included because different types of regulators can be applied and their connection to this variable speed drive is very easy.

One of the main advantages of this invention is due to the extreme simplicity of the sealing of the variable drive assembly. In FIGS. 1,9,26 and 28 it can be seen that the only possible fluid leak in the whole variable drive assembly can occur through the engagement between the bearings 102 and their openings 103 and 104, and through the engagement of the shafts 20 and 21 of the rotors in their bearings 14' and 15' of FIGS. 1 and 9. Since the fitting between shafts and bearings is common and normal in hydraulic vane pumps and motors, and it is correctly achieved, we will only refer to the fitting of 102 with 103 and 104, which is similar to the fitting of the shafts of the rotors 20 and 21 but with a diameter that is somewhat larger, with the particularity that in the practice the magnitude of its rotation can be disregarded, since it will only take place when the variable drive mechanism or lever is actuated upon to change the speed ratio, such that its fluidtightness will be very efficient, considering the O-rings 91 that seal it; this system is therefore very simple and efficient, because of the absence of frictions and other possible complications that other sealing systems could cause.

Regarding the position of the shafts of the rotors, which in the illustrated example is such that the shaft of the rotor of the hydraulic motor is engaged within that of the hydraulic pump, but with the possibility of free rotation by virtue of the bearings 90, both shafts could have been fixed through their outer ends without physical contact between them, like in some known vane pumps and motors, thereby eliminating the central opening of the port plate.

From all that has been explained above it is obvious that this variable speed drive is of great simplicity and compactness, performs perfectly the function of speed variation and has a very reduced volume.

For example, the described and claimed variable speed drive works without any fluidtightness problem with pressures of 200 bar and more, therefore transmitting torques and powers much higher than those achieved in the state of the art; the speed ratio between input and output can be as high as about 1:8.

By way of example, it may be mentioned that a variable drive according to the invention, able to transmit a power of 825 HP, weights just 234 Kg; for a smaller power, for example 70 HP, the variable drive can weight as little as 28 Kg.

By virtue of these adventages, in most cases the use of the variable drive according to the invention is easy and has a reduced cost; consequently, the range of possible applications of the variable drive is very wide. Some of this applications are described below; however, this selection can't be regarded as a limitation.

In the field of machine tools, such as drilling machines, lathes, milling machines, grinding machines and the like, the variable drive according to the invention allows to modify continuously, readily and with no significant losses, the speed of the cutting tool or of the blank; in a lathe, for instance, the optimum cutting speed can be kept constant by increasing the speed of the blank as the tool approaches the rotation center thereof.

The variable speed drive can also be applied in the field of textile machines, all of them having similar problems. In the spinning throstles, for instance, it solves in a simple manner and without power consumption the problems of starting and stopping the machine, avoiding the need to provide expensive clutches, and allows to extend as much as desired the acceleration and deceleration operations, which is not possible with a clutch; it also allows to pass from a one speed to another at any time, for example for obtaining spinning samples. Another important advantage of the variable drive of the invention in the application to textile machines is that it allows to reduce the power of the motor of the machine, because during the start-up it will not be necessary to use a high additional power to overcome the inertial forces.

In the automotive industry, the described variable drive can substitute the gear box and the clutch, and provide a continuous variation of the speed ratios; and, furthermore, with a study of the desired performance of a vehicle it is possible to establish the optimum torque for each speed and to program a control mechanism for the variable drive in order to establish a specific ratio between the rotation of the wheels and the rotation of the motor. It is even possible, without introducing any modification, to program different parameters for different driving areas (city, road, motorway, etc.) and to give the driver the possibility to select one of them from the board of the vehicle.

Another example of the applications of the variable drive is constituted by the compressors for air conditioners: these compressor achieve their optimum point of operation for a specific number of rpm, but their are connected to a motor having a variable number of rpm, and normally they don't work at their optimum number of rpm. With the described variable drive, whose operation can be controlled through a small chip and a motor of very scarce power, it is possible to adjust as desired the number of rpm of the compressor, i.e. it is possible to regulate at will the frigories provided by said compressor, with a considerable gain in efficiency and performance.

I claim:

1. Variable speed drive assembly of the type that comprise an hydraulic pump and an hydraulic motor, in which the power transmission is achieved by means of a fluid circulating in close circuit between them, such that the flow rate displaced by the hydraulic pump must be received by the hydraulic motor and subsequently returned to the hydraulic pump, and in which both the hydraulic pump and the hydraulic motor are vane pumps, constituted by a cylinder (29,39) and a rotor (40,50) from which emerge radially vanes (41,51) which, by extending outwards to fit against the inner wall of said cylinder (29,39) and laterally to fit against two covers (30,55), form cells that are fluidtight from each other, one or both of said covers being provided with a central opening to let the shafts of the rotors (40,50) protrude outwards therethrough, any rotation ratio between the rotor (40) of the hydraulic pump and the rotor (50) of the hydraulic motor, between zero and a maximum value, being achieved by varying the eccentricity of the rotor (40) of the hydraulic pump, of the rotor (50) of the hydraulic motor or of both, characterized in that:

the cylinder (29) of the hydraulic pump, the cylinder (39) of the hydraulic motor and their respective end covers (30,55) form an integral body constituting the variable drive assembly, the cylinders having geometric axes (65,66) that are parallel but not coincident, and the only possible movement of said variable drive assembly being rotation with respect to a third geometric axis (23) that is static with respect to a support member (10,11) and parallel to said geometric axes (65,66) of the cylinders;

the rotor (40) of the hydraulic pump and the rotor (50) of the hydraulic motor have a common geometric axis (22), with a static and eccentric position with respect to said support member (10,11), parallel to the geometric axes (65,66) of the cylinders of the hydraulic pump and the hydraulic motor and displaced a distance (E) with respect to said third geometric axis (23), both rotors (40,50) being able to turn independently from each other with respect to said common geometric axis (22);

the rotation of said variable drive assembly is actuated from the outside and causes, through a variation of the eccentricity of the rotors (40,50) with respect to their respective cylinders (29,39), the effect of variation of said rotation ratio between the rotor (40) of the hydraulic pump and the rotor (50) of the hydraulic motor, the position of the variable drive assembly with respect to said support member being defined by an angle $\alpha$, $\alpha=0$ corresponding to a starting position in which the cylinder (29) of the hydraulic pump and its rotor (40) are concentric.

2. Variable speed drive as claimed in claim 1, characterized in that at least a central port plate (38,43) is provided between the hydraulic pump and the hydraulic motor, integral with said variable drive assembly and therefore rotating together therewith with respect to said geometric axis (23), said central port plate (38,43) being provided with two through openings (44,46;45,47) between the hydraulic pump and the hydraulic motor, said openings (44;45) in their region of contact with the hydraulic pump being symmetrically defined with respect to a port bisector (69) of the hydraulic pump, and said openings (46;47) in their region of contact with the hydraulic motor being symmetrically defined with respect to a port bisector (70) of the hydraulic motor, said bisectors (69,70) having non-coincident directions in order to span the angular displacement between hydraulic pump and hydraulic motor, such that the first opening (44 and 46) communicates practically the whole fluid expulsion region of the hydraulic pump with the fluid reception region of the hydraulic motor, a single high pressure chamber being thereby defined, while the second opening (45 and 47) communicates practically the whole fluid return region of the hydraulic motor with the fluid admission region of the hydraulic pump, a single low pressure chamber being thereby defined, the port bisectors (69,70) of the hydraulic pump and of the hydraulic motor being therefore the imaginary straight lines that separate the high pressure chamber from the low pressure chamber in the hydraulic pump and in the hydraulic motor, respectively, said port plate being further provided with a third central opening (48,49) having the purpose of letting therethrough the aligned shafts of the rotors (40,50).

3. Variable speed drive as claimed in claim 2, characterized in that its constructive parameters satisfy the following equation:

$$E\ Hb\ Rb\ \sin(\beta) - E'\ Hm\ Rm\ \sin(\rho) = 0,$$

where:

$\beta$ is the angle defined between the port bisector (69) of the hydraulic pump and the perpendicular to a geometric axis (Wb) joining said third geometric axis (23) with the geometric axis (65) of the cylinder of the hydraulic pump;

$\rho$ is the angle defined between the port bisector (70) of the hydraulic motor and the perpendicular to a geometric axis (Wm) joining said third geometric axis (23) with the geometric axis (66) of the cylinder of the hydraulic motor;

Hb and Hm are the thicknesses of the hydraulic pump and the hydraulic motor, respectively;

Rb and Rm are the radii of the cylinder (29) of the hydraulic pump and of the cylinder (39) of the hydraulic motor, respectively;

E and E' are the distances between said third geometric axis (23) and the geometric axes (65,66) of the cylinder (29) of the hydraulic pump and of the cylinder (39) of the hydraulic motor, respectively;

such that the torque acting on said third geometric axis (23) due to the fluid pressure exerted on the cylinder (29) of the hydraulic pump is equal in magnitude and opposite in direction to the torque acting on the same axis (23) due to the fluid pressure exerted on the cylinder (39) of the hydraulic motor, the resultant torque on said third geometric axis (23) being therefore null.

4. Variable speed drive as claimed in claim 1, characterized in that the variable drive assembly and the shafts (24,20,25;28,53,21,88) of the rotors (40,50) are arranged on said support member (10,11) by means of double-eccentric bearings (14,15), each bearing being provided with an inner eccentric bore (14',15') for the passage of the corresponding shafts (20,21) of the rotors, and with outer eccentric cylindrical surfaces (17,102;17,102) on which slide complementary cylindrical surfaces (18,103;19,104) formed with this purpose on the side surface of the corresponding cylinder (29,39) of the variable drive assembly, said cylindrical surfaces (7,102;18,103;19,104) being coaxial with said third geometric axis (23).

5. Variable speed drive as claimed in claim 4, characterized in that said double-eccentric bearing (14,15) are friction bearings.

6. Variable speed drive as claimed in claim 4, characterized in that the fluidtightness between the variable drive assembly and a housing integral with said support member (10,11) is achieved by means of the fitting of said outer cylindrical surfaces (17,102;17,102) and complementary cylindrical surfaces (18,103;19,104) and by the arrangement of fluidtight seals.

7. Variable drive assembly as claimed in claim 1, characterized in that the rotor (40) of the hydraulic pump and the rotor (50) of the hydraulic motor are secured on two corresponding shafts (24,20,25 and 28,53,21,88), said shafts being aligned along said common geometric axis (22) but without being integral with each other, so that the rotation speed of the rotor (40) of the hydraulic pump can be different from the rotation speed of the rotor (50) of the hydraulic motor, the ratio between both speeds depending on the angular position ($\alpha$) of said variable drive assembly with respect to said support member (10,11).

8. Variable speed drive as claimed in claim 2, characterized in that it comprises a by-pass passage (5,60,63,4) between the high pressure chamber and the low pressure chamber, and a valve (3) for opening and closing the fluid flow therethrough depending on the angular position of said variable drive assembly with respect to the support element (10,11), said valve (3) allowing fluid flow between the chambers when the variable drive assembly is in the starting position ($\alpha=0$), and progressively closing off said fluid flow as the variable drive assembly moves away from said starting position, until the complete closure is achieved after a few rotation degrees of the variable drive assembly, so that said valve (3) performs a declutching function as the variable drive assembly turns with respect to the support member (10,11) away from said starting position ($\alpha=0$), while it performs a clutching function as the variable drive assembly moves in the opposite direction, the rotation of the shaft of the hydraulic motor being free in said starting position ($\alpha=0$) of the variable drive assembly.

9. Variable speed drive as claimed in claim 8, characterized in that said valve (3) is a rotary valve having an inner passage (60) and a side opening (59) which, depending on its angular position, opens or closes the fluid flow, and comprises a stem (7) concentric and integral therewith on which a trigger (6) is arranged, said trigger causing rotation of the valve upon engagement with a stop (2) integral with the support member (11), in the positions of the variable drive assembly near said starting position ($\alpha=0$).

* * * * *